(12) United States Patent
Yamashita et al.

(10) Patent No.: US 10,844,769 B2
(45) Date of Patent: Nov. 24, 2020

(54) EXHAUST DEVICE OF MOTORCYCLE

(71) Applicant: HONDA MOTOR CO., LTD., Tokyo (JP)

(72) Inventors: Akihiro Yamashita, Wako (JP);
Toshiya Nagatsuyu, Wako (JP);
Hideaki Tajiri, Wako (JP); Yasumasa Matsui, Tokyo (JP); Yu Oishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 413 days.

(21) Appl. No.: 15/560,946

(22) PCT Filed: Mar. 9, 2016

(86) PCT No.: PCT/JP2016/057468
§ 371 (c)(1),
(2) Date: Sep. 22, 2017

(87) PCT Pub. No.: WO2016/152541
PCT Pub. Date: Sep. 29, 2016

(65) Prior Publication Data
US 2018/0080364 A1 Mar. 22, 2018

(30) Foreign Application Priority Data
Mar. 24, 2015 (JP) .................. 2015-060879

(51) Int. Cl.
*F01N 13/00* (2010.01)
*F01N 3/10* (2006.01)
(Continued)

(52) U.S. Cl.
CPC ............. *F01N 13/008* (2013.01); *B62M 7/02* (2013.01); *F01N 3/10* (2013.01); *F01N 3/20* (2013.01);
(Continued)

(58) Field of Classification Search
CPC ............... F01N 11/007; F01N 2590/04; F01N 2550/02; F01N 2560/025; F01N 13/008;
(Continued)

(56) References Cited

U.S. PATENT DOCUMENTS 1,721,250 A * 7/1929 Greenhalgh ........... B01D 25/02
210/93
2004/0206564 A1 10/2004 Nagashii et al.
(Continued)

FOREIGN PATENT DOCUMENTS

CN 103306792 A 9/2013
EP 0699829 A2 3/1996
(Continued)

OTHER PUBLICATIONS

Website Image https://www.partzilla.com/catalog/honda/motorcycle/2004/cb600f-a-599/crankcase (Year: 2020).*
(Continued)

*Primary Examiner* — Tuan C To
*Assistant Examiner* — Paul A Castro
(74) *Attorney, Agent, or Firm* — Birch, Stewart, Kolasch & Birch LLP

(57) ABSTRACT

An exhaust device for a saddle-type vehicle having a pipe section with respect to a vehicle body and housing a catalyzer therein, and a muffler connected to a rear end of the pipe section includes an upstream oxygen sensor disposed on the pipe section and positioned upstream of the catalyzer and a downstream oxygen sensor disposed on the pipe section and positioned downstream of the catalyzer. The pipe section includes a larger-diameter portion having an increased diameter for housing the catalyzer therein. The downstream oxygen sensor is disposed in the larger-diameter portion. The upstream oxygen sensor and the downstream oxygen sensor are positioned upwardly of a central
(Continued)

line of the larger-diameter portion with respect to the vehicle body as viewed in side elevation of the vehicle body.

14 Claims, 30 Drawing Sheets

(51) Int. Cl.
    *F01N 13/08*         (2010.01)
    *F01N 3/20*          (2006.01)
    *F02B 67/00*         (2006.01)
    *F01N 13/18*         (2010.01)
    *F01N 3/24*          (2006.01)
    *F02B 61/02*         (2006.01)
    *F02D 35/00*         (2006.01)
    *B62M 7/02*          (2006.01)
    *F01N 11/00*         (2006.01)

(52) U.S. Cl.
CPC ............. *F01N 3/24* (2013.01); *F01N 11/007* (2013.01); *F01N 13/00* (2013.01); *F01N 13/007* (2013.01); *F01N 13/08* (2013.01); *F01N 13/18* (2013.01); *F01N 13/1811* (2013.01); *F02B 61/02* (2013.01); *F02B 67/00* (2013.01); *F02D 35/00* (2013.01); *F01N 2550/02* (2013.01); *F01N 2560/025* (2013.01); *F01N 2560/14* (2013.01); *F01N 2590/04* (2013.01); *F01N 2900/0416* (2013.01); *Y02A 50/2322* (2018.01); *Y02T 10/47* (2013.01)

(58) Field of Classification Search
CPC .... F01N 2430/06; F01N 13/10; F01N 3/0814; F01N 3/105; Y02T 10/47; B60Y 2200/12; G01M 15/10
See application file for complete search history.

(56) References Cited

U.S. PATENT DOCUMENTS

| | | | | |
|---|---|---|---|---|
| 2012/0186895 | A1* | 7/2012 | Hamauzu | B60T 8/3225 |
| | | | | 180/312 |
| 2013/0012081 | A1* | 1/2013 | Morota | B63H 21/32 |
| | | | | 440/38 |
| 2013/0228008 | A1* | 9/2013 | Tsunekawa | G01M 15/10 |
| | | | | 73/114.75 |
| 2014/0338312 | A1 | 11/2014 | Yanase et al. | |

FOREIGN PATENT DOCUMENTS

| | | | | |
|---|---|---|---|---|
| EP | 2489847 A2 * | 8/2012 | | F01N 13/008 |
| JP | 06-73320 U | 10/1994 | | |
| JP | 2000-274233 A | 10/2000 | | |
| JP | 2003-193835 A | 7/2003 | | |
| JP | 2004-301026 A | 10/2004 | | |
| JP | 3143323 U | 7/2008 | | |
| JP | 2010-255514 A | 11/2010 | | |
| JP | 2012-26306 A | 2/2012 | | |
| JP | 2013-014278 A | 1/2013 | | |
| JP | 2014-227843 A | 12/2014 | | |

OTHER PUBLICATIONS

Website Image Honda CB600f Hornet https://www.motorcyclespecs.co.za/model/Honda/honda_cb600f_hornet%2000.htm (Year: 2020).*
International Search Report for PCT/JP2016/057468 (PCT/ISA/210) dated May 31, 2016.
Office Action dated Mar. 22, 2017 for the corresponding TW application 105108950.
Extended European Search Report, dated Aug. 30, 2018, for European Application No. 16768444.8.
Chinese Office Action and Search Report, dated Jan. 8, 2019, for Chinese Application No. 201680017613.3, along with an English translation of the Chinese Office Action.

* cited by examiner

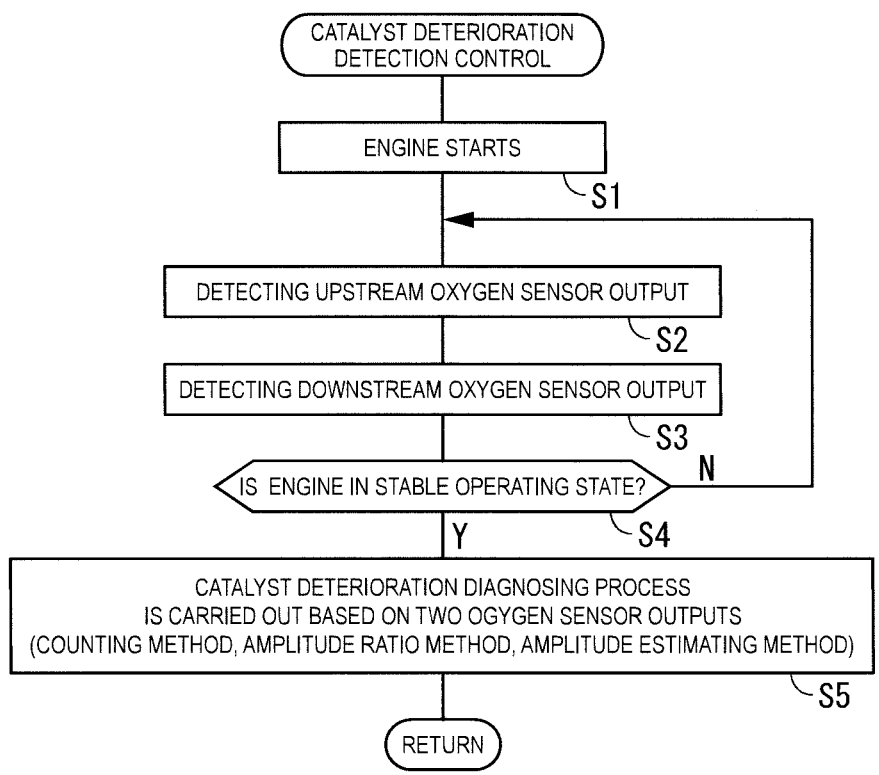

EXHAUST DEVICE OF MOTORCYCLE

CROSS-REFERENCE TO RELATED APPLICATIONS

This application is the National Phase of PCT International Application No. PCT/JP2016/057468, filed on Mar. 9, 2016, which claims priority 35 U.S.C. 119(a) to Patent Application No. 2015-060879, filed in Japan on Mar. 24, 2015, all of which are hereby expressly incorporated by reference into the present application.

TECHNICAL FIELD

The present invention relates to an exhaust device for a motorcycle, and more particularly to an exhaust device for a motorcycle which is capable of detecting the degree of deterioration of a catalyst due to aging or the like.

BACKGROUND ART

Heretofore, there has been known an exhaust device for vehicles which includes a catalyzer for purifying an exhaust gas that is disposed midway in an exhaust passage extending from an exhaust pipe connected to the exhaust port of an engine to a muffler on a rear portion of a vehicle body. In order to combine such an exhaust device with an oxygen sensor ($O_2$ sensor) for detecting the oxygen concentration of the exhaust gas and feeding it back to engine control, it is necessary to consider an optimum position for the oxygen sensor as well as its relationship to the catalyzer.

Patent Document 1 discloses an exhaust device for saddle-type vehicles in which exhaust pipes connected to a plurality of exhaust port of a multi-cylinder engine are collected together below the engine and coupled to a single intermediate pipe, a muffler being connected to the intermediate pipe, a catalyzer is housed in a larger-diameter portion disposed midway in the intermediate pipe, and an oxygen sensor is installed on a portion of the intermediate pipe upstream of the catalyzer.

CITATION LIST

Patent Literature

Patent Document 1: JP 2010-255514 A

SUMMARY OF INVENTION

Technical Problem

In recent years, there have been demands for deterioration detection for continuously monitoring whether an installed catalyzer is exerting its desired performance, as well as an increase in the purifying performance of the catalyzer. The deterioration detection needs two oxygen sensors disposed at least upstream and downstream of the catalyzer. On saddle-type vehicles where an extra space is small and an exhaust device is exposed outwardly, it is necessary to consider not only the function of the deterioration detection but also the layout of oxygen sensors in a manner to meet conditions about how the oxygen sensors affect the appearance and should be prevented from undergoing failures.

It is an object of the present invention to provide an exhaust device for a motorcycle which will solve the above tasks of the existing technology and which has two oxygen sensors, disposed in suitable positions, for making it possible to detect deterioration of a catalyzer.

Solution to Problems

To achieve the afore-mentioned object, the present invention has a first feature in that an exhaust device (20) for a motorcycle having a pipe section (19) extending below an engine (E) for guiding an exhaust gas therefrom rearwardly with respect to a vehicle body and housing a catalyzer (C) therein, and a muffler (26) connected to a rear end of said pipe section (19), comprising: an upstream oxygen sensor (U) disposed on said pipe section (19) and positioned upstream of said catalyzer (C) and a downstream oxygen sensor (D) disposed on said pipe section (19) and positioned downstream of said catalyzer (C), wherein said pipe section (19) includes a larger-diameter portion (61) having an increased diameter for housing said catalyzer (C) therein, said downstream oxygen sensor (D) is disposed in said larger-diameter portion (61), and said upstream oxygen sensor (U) said downstream oxygen sensor (D) are positioned upwardly of a central line (Oc) of said larger-diameter portion (61) with respect to the vehicle body as viewed in side elevation of the vehicle body, said engine (E) has a cylinder (43) whose cylinder axis (Os) is inclined forwardly of the vehicle body with respect to a vertical direction (V), said larger-diameter portion (61) is disposed such that said larger-diameter portion (61) has an axis (Oc) substantially parallel to said cylinder axis (Os), and said upstream oxygen sensor (U) is mounted outwardly from the inside of said pipe section (19) in the vehicle widthwise direction, said larger-diameter portion (61) is positioned outside of an oil filter (53) which is projected into a front surface of a crankcase (52), and an intermediate pipe (62) coupled to the rear end of the larger-diameter portion (61) passes through side portions of an oil pan (54) below said crankcase (52).

The present invention has a second feature in that said larger-diameter portion (61) is positioned below a cylinder block (43) of said engine (E) and in front of a crankcase (52) of said engine (E), and both said upstream oxygen sensor (U) and said downstream oxygen sensor (D) include a heaterless oxygen sensor (100) free of a heater function.

The present invention has a third feature in that dispersing means (80, 81, 82) for dispersing the exhaust gas which has passed through said catalyzer (C) is provided between said catalyzer (C) and said downstream oxygen sensor (D) within said larger-diameter portion (61).

The present invention has a fourth feature in that said upstream oxygen sensor (U) is mounted on an outlet pipe (60) positioned upstream of said larger-diameter portion (61).

The present invention has a fifth feature in that even said outlet pipe (60) includes a smaller-diameter portion (66) connected to an exhaust port of said engine (E), said upstream oxygen sensor (U) being mounted on said smaller-diameter portion (66), and a bent portion (67) connected to said smaller-diameter portion (66) for bending a direction in which the exhaust gas is discharged rearwardly with respect to the vehicle body and connected to said larger-diameter portion (61), and said bent portion (67) has a recessed-projected portion (68) configured to disperse the exhaust gas.

The present invention has a seventh feature in that said larger-diameter portion (61) is of an assembled hollow structure having a mating region (65) of two separate members of an outer shell (76) which are joined to each other, and a mount boss (106) for mounting said downstream oxygen sensor (D) thereon is provided in a position on said mating region (65), thereby closing a clearance (79) on a reverse side of said mating region (65) with said mount boss (106).

The present invention has an eighth feature in that said larger-diameter portion (61) includes a front portion as said outer shell (76) which is of said assembled hollow structure, and a rear portion (83) as an integral component, said catalyzer (C) is disposed in said front portion, and said dispersing means (80, 81, 82) and said downstream oxygen sensor (D) are disposed on said rear portion (83).

The present invention has a ninth feature in that a catalyst diagnosing unit (72) configured to diagnose and detect a deteriorated state of said catalyzer (C) on the basis of sensor outputs from said upstream oxygen sensor (U) and said downstream oxygen sensor (D) is comprised, wherein when said catalyst diagnosing unit (72) diagnoses said catalyzer (C) as being deteriorated, an indicator (74) is activated to indicate the deteriorated state to an occupant of the saddle-type vehicle.

Advantageous Effects of Invention

According to the first feature, an upstream oxygen sensor (U) disposed on said pipe section (19) and positioned upstream of said catalyzer (C) and a downstream oxygen sensor (D) disposed on said pipe section (19) and positioned downstream of said catalyzer (C), wherein said pipe section (19) includes a larger-diameter portion (61) having an increased diameter for housing said catalyzer (C) therein, said downstream oxygen sensor (D) is disposed in said larger-diameter portion (61), said upstream oxygen sensor (U) and said downstream oxygen sensor (D) are positioned upwardly of a central line (Oc) of said larger-diameter portion (61) with respect to the vehicle body as viewed in side elevation of the vehicle body, said engine (E) has a cylinder (43) whose cylinder axis (Os) is inclined forwardly of the vehicle body with respect to a vertical direction (V), said larger-diameter portion (61) is disposed such that said larger-diameter portion (61) has an axis (Oc) substantially parallel to said cylinder axis (Os), said upstream oxygen sensor (U) is mounted outwardly from the inside of said pipe section (19) in the vehicle widthwise direction, said larger-diameter portion (61) is positioned outside of an oil filter (53) which is projected into a front surface of a crankcase (52), and an intermediate pipe (62) coupled to the rear end of the larger-diameter portion (61) passes through side portions of an oil pan (54) below said crankcase (52). Therefore, even on the saddle-type vehicle where an extra space is small, the downstream oxygen sensor can be installed in place by effectively utilizing a space provided by the larger-diameter portion. As the upstream oxygen sensor and the downstream oxygen sensor are positioned upwardly in the vehicle body of the central line of the larger-diameter portion, both the oxygen sensors are protected from jumping pebbles, and the oxygen sensors can be installed without affecting the bank angle of a motorcycle. Furthermore, the outlet pipe that is connected to a cylinder head is bent from its junction substantially at a right angle rearwardly and downwardly with respect to the vehicle body to be connected to the larger-diameter portion, making it possible place the engine and the larger-diameter portion closely to each other thereby to effectively utilize a space in front of the engine. The layout of the pipe section is made possible which sufficiently takes advantage of the structure in which the bent portion is provided with the recessed-projected portion to allow the exhaust gas to pass evenly through the catalyzer. Furthermore, the upstream oxygen sensor is made much less exposed to external view by mounted outwardly from the inside in the vehicle widthwise direction. The larger-diameter portion is positioned outside of an oil filter which is projected into a front surface of a crankcase, and an intermediate pipe coupled to the rear end of the larger-diameter portion passes through side portions of an oil pan below said crankcase. Hereby the downstream oxygen sensor also is made much less exposed to external view. As a result, the appearance of the motorcycle can be improved.

According to the second feature, said larger-diameter portion (61) is positioned below a cylinder block (43) of said engine (E) and in front of a crankcase (52) of said engine (E), and both said upstream oxygen sensor (U) and said downstream oxygen sensor (D) include a heaterless oxygen sensor (100) free of a heater function. Therefore, the two oxygen sensors are disposed in a region close to the engine, so that the oxygen sensors need no heater function, and hence the cost of the parts can be reduced.

According to the third feature, dispersing means (80, 81, 82) for dispersing the exhaust gas which has passed through said catalyzer (C) is provided between said catalyzer (C) and said downstream oxygen sensor (D) within said larger-diameter portion (61). Therefore, when the angle of a passageway for an exhaust gas varies between the larger-diameter portion and an intermediate pipe connected to a rear portion of the larger-diameter portion, the exhaust gas gathers in a low area at the junction with the intermediate pipe, avoiding affecting measurement by the downstream oxygen sensor provided on an upper portion of the larger-diameter portion. Therefore, the accuracy of measurement by the downstream oxygen sensor can be increased.

According to the fourth feature, said upstream oxygen sensor (U) is mounted on an outlet pipe (60) positioned upstream of said larger-diameter portion (61). Therefore, when the angle of a passageway for an exhaust gas varies between the larger-diameter portion and an intermediate pipe connected to a rear portion of the larger-diameter portion, the exhaust gas gathers in a low area at the junction with the intermediate pipe, avoiding affecting measurement by the downstream oxygen sensor provided on an upper portion of the larger-diameter portion. Therefore, the upstream oxygen sensor can be installed in a position where a heaterless oxygen sensor is applicable because of being close to a heat source, using an extra space provided in a vehicle widthwise direction by the outlet pipe.

According to the fifth feature, said outlet pipe (60) includes a smaller-diameter portion (66) connected to an exhaust port of said engine (E), said upstream oxygen sensor (U) being mounted on said smaller-diameter portion (66), and a bent portion (67) connected to said smaller-diameter portion (66) for bending a direction in which the exhaust gas is discharged rearwardly with respect to the vehicle body and connected to said larger-diameter portion (61), and said bent portion (67) has a recessed-projected portion (68) configured to disperse the exhaust gas. Therefore, the outlet pipe with the bent portion makes it possible to place the larger-diameter portion in a position closer to the engine for enabling the catalyzer to exert its performance sufficiently. By providing the recessed-projected portion, providing the bent portion is capable of dispersing the exhaust gas, which tends to gather in one side of a tubular passage, allowing the exhaust gas to pass through the catalyzer in its entirety.

According to the seventh feature, said larger-diameter portion (61) is of an assembled hollow structure having a mating region (65) of two separate members of an outer shell (76) which are joined to each other, and a mount boss (106)

for mounting said downstream oxygen sensor (D) thereon is provided in a position on said mating region (65), thereby closing a clearance (79) on a reverse side of said mating region (65) with said mount boss (106). Therefore, the exhaust gas that passes through the clearance formed on the reverse side of the mating region of the assembled hollow structure without passing through the catalyzer does not collide to with the downstream oxygen sensor installed on the larger-diameter portion of the assembled hollow structure. Thus an output of the downstream oxygen sensor is prevented from affected by the exhaust gas.

According to the eighth feature, said larger-diameter portion (61) includes a front portion as said outer shell (76) which is of said assembled hollow structure, and a rear portion (83) as an integral component, said catalyzer (C) is disposed in said front portion, and said dispersing means (80, 81, 82) and said downstream oxygen sensor (D) are disposed on said rear portion (83). Therefore, the ease with which to assemble the parts to manufacture the larger-diameter portion is increased by welding three overlapping sheets though the number of parts used increases, and the installation of the diffusing means in the form of a diffusion plate or the like is facilitated. As the downstream oxygen sensor is provided on the rear half portion, the rear half portion that is provided as an integral part by a drawing process, a welding process, or the like reduces the possibility that the exhaust gas passing through the clearance of the assembled hollow structure will affect the sensor output.

According to the ninth feature, a catalyst diagnosing unit (72) configured to diagnose and detect a deteriorated state of said catalyzer (C) on the basis of sensor outputs from said upstream oxygen sensor (U) and said downstream oxygen sensor (D) is comprised, wherein when said catalyst diagnosing unit (72) diagnoses said catalyzer (C) as being deteriorated, an indicator (74) is activated to indicate the deteriorated state to an occupant of the saddle-type vehicle. Therefore, a deteriorated state of the catalyzer is indicated to the occupant or the like by the turning on or blinking of the indicator, so that the vehicle is prevented from traveling on while the catalyzer is being deteriorated.

BRIEF DESCRIPTION OF DRAWINGS

FIG. 7 is a flowchart of a catalyst deterioration detection control sequence.

DESCRIPTION OF EMBODIMENTS

Figure 1:
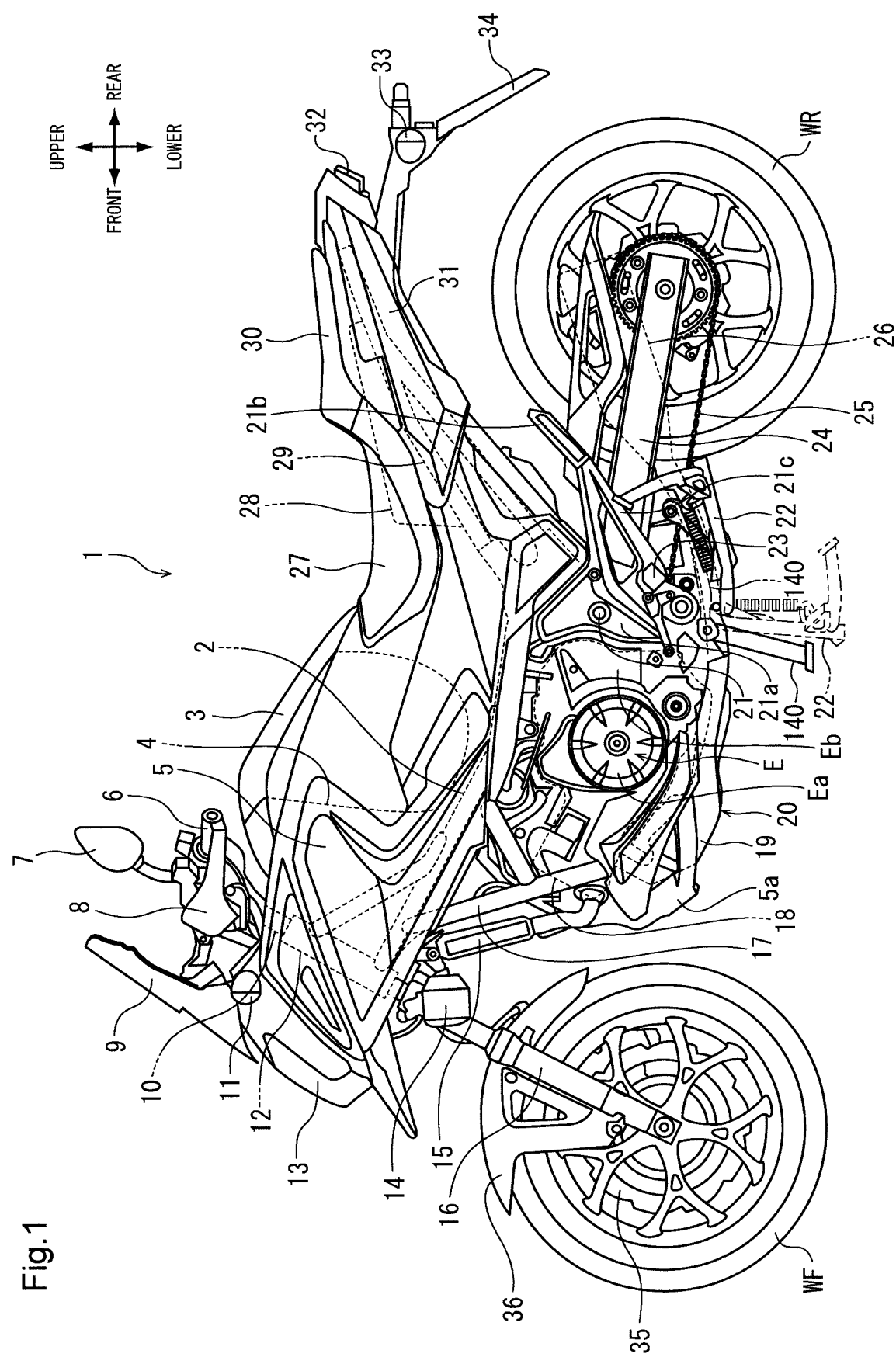
FIG. 1 is a left-hand side elevational view of a motorcycle incorporating therein an exhaust device for a motorcycle according to an embodiment of the present invention.
Figure 2:
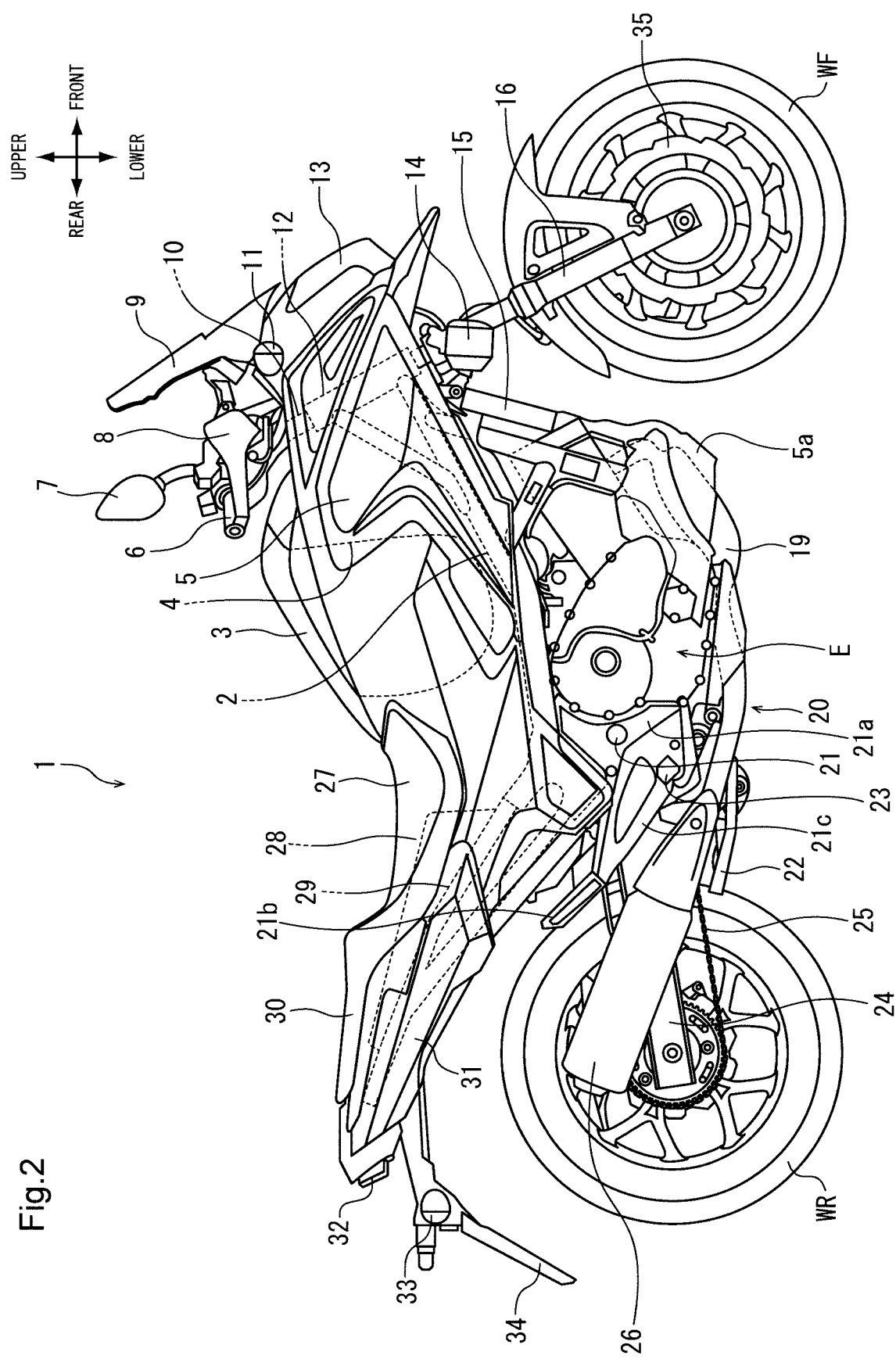
FIG. 2 is a right-hand side elevational view of the motorcycle.
Figure 3:
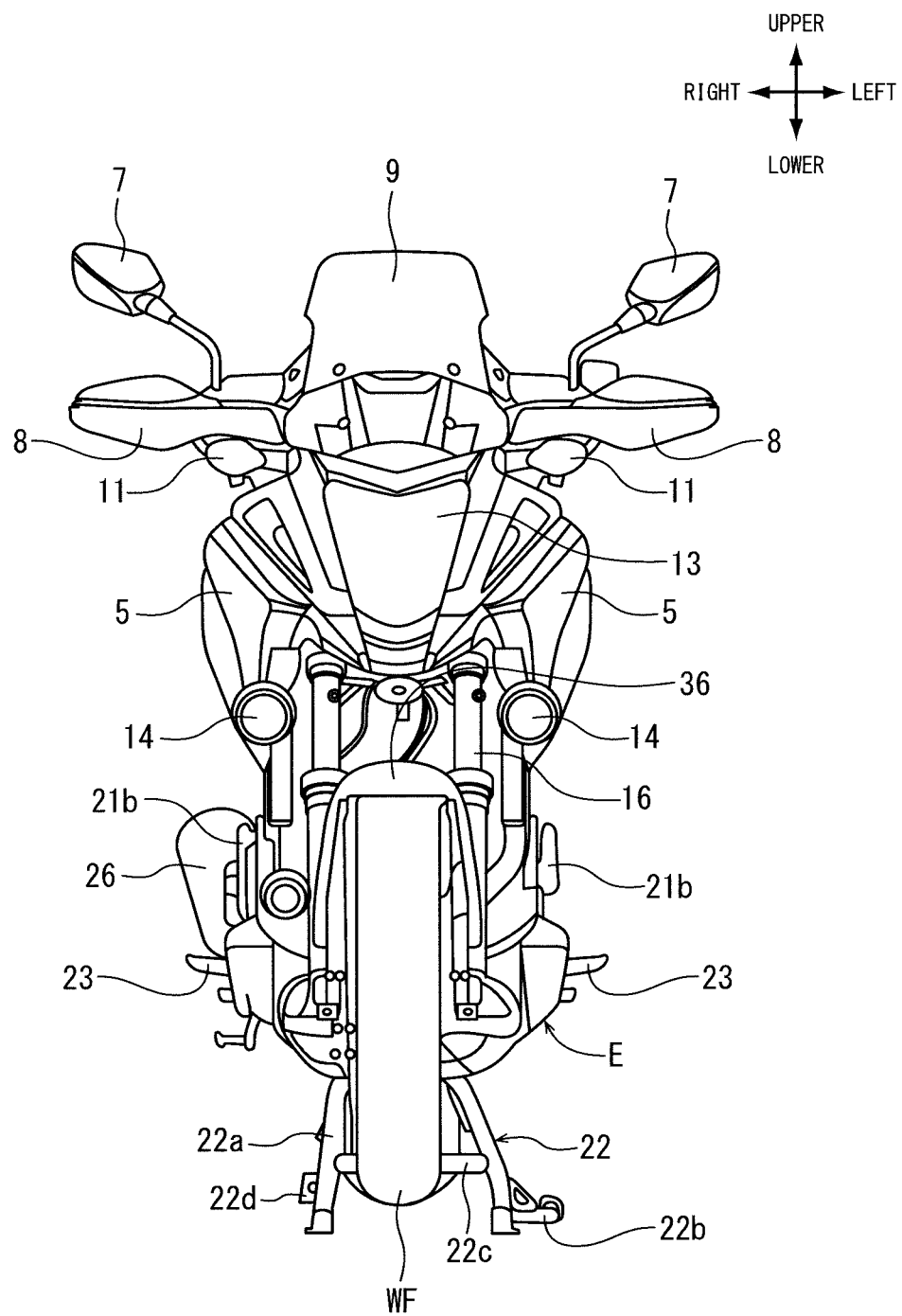
FIG. 3 is a front elevational view of the motorcycle.
Figure 4:
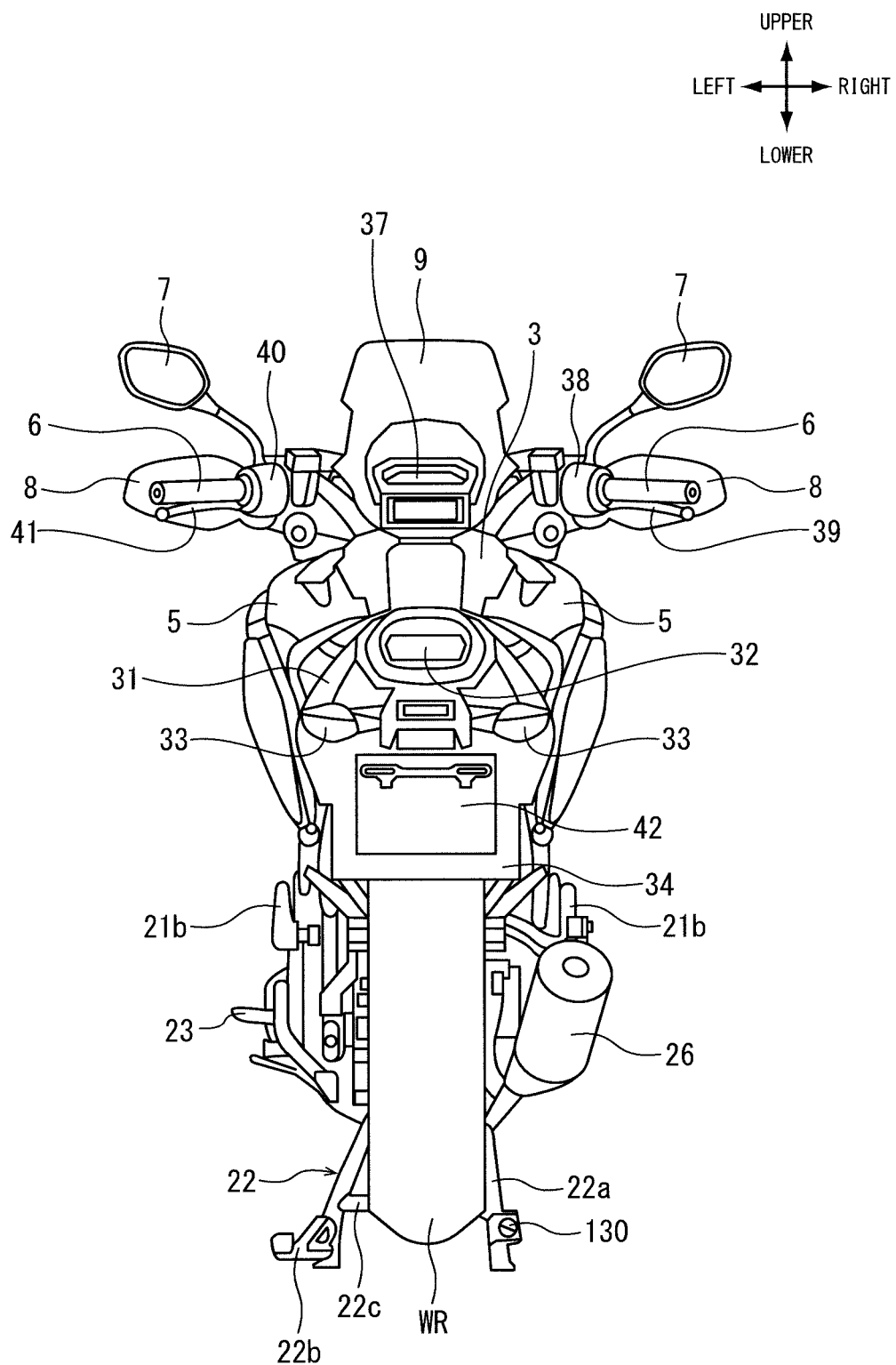
FIG. 4 is a rear elevational view of the motorcycle.

Preferred embodiments of the present invention will be described in detail below with reference to the drawings. FIG. 1 is a left-hand side elevational view of a motorcycle 1 incorporating therein an exhaust device 20 according to an embodiment of the present invention. FIG. 2 is a right-hand side elevational view of the motorcycle 1. FIG. 3 is a front elevational view of the motorcycle 1. FIG. 4 is a rear elevational view of the motorcycle 1.

The motorcycle 1 as a saddle-type vehicle includes a vehicle frame 2 having a front end on which there is mounted a head pipe 12 with a steering stem 10 angularly movably supported thereon. A steering handle 6 is installed on the upper end of the steering stem 10 by a top bridge, not illustrated. The top bridge, which is angularly movable in unison with the steering stem 10, and a bottom bridge, not illustrated, fixed to the steering stem 10 beneath the head pipe 12 jointly support a pair of left and right front fork legs 16. A front wheel WF provided with a brake disk 35 is rotatably supported on the lower ends of the front fork legs 16.

A parallel two-cylinder engine E whose cylinder head 18 has a lower portion supported by a hanger frame 17 extending downwardly from behind the head pipe 12 is disposed on a lower portion of the vehicle frame 2. A generator cover Ea and a drive sprocket cover Eb are mounted on a left side of the engine E in a vehicle widthwise direction. A radiator 15 for an engine coolant is disposed in front of the hanger frame 17. The vehicle frame 2 supports upper and lower portions of the engine E, and also supports a swing arm 24 swingably through a pivot 21. A pair of left and right rider's footsteps 23 are provided below a pivot plate 21a on which the pivot 21 is supported, and foldable passenger's footsteps 21b are disposed on step brackets 21c extending rearwardly and upwardly therefrom. Beneath the rider's footsteps 23, there are installed a main stand 22 for making the motorcycle 1 stand still on its own with a rear wheel WR off the ground when the motorcycle 1 is stopped, and a side stand 140 for making the motorcycle 1 stand still on its own while the vehicle body of the motorcycle 1 is tilted to the left. The main stand 22 and the side stand 140 are brought into a stored state by swinging at approximately 90 degrees in a rearward direction of the vehicle body.

The exhaust device 20 for purifying and silencing an exhaust gas from the engine E and discharging the exhaust gas rearwardly is mounted on a lower portion of the vehicle body of the motorcycle 1. The exhaust device 20 has a pipe section 19 connected to the exhaust port of the cylinders for guiding the exhaust gas rearwardly, and a muffler 26 connected to the rear end of the pipe section 19. An exhaust pipe cover 5a that covers front and side portions of the pipe section 19 is disposed forwardly and downwardly of the cylinder head 18. The swing arm 24 supported swingably through the pivot 21 is suspended from the vehicle frame 2 by a rear cushion, not illustrated. Driving power from the engine E is transmitted by a drive chain 25 to the rear wheel WR which is rotatably supported on the rear end of the swing arm 24.

A storage box 4 that is accessible through a large-size openable and closable lid 3 is provided in a position covered by side cowls 5 as outer covering members above the engine E. A headlight 13 is disposed in front of the side cowls 5, and a pair of direction indicating devices 11 and a windscreen 9 are disposed above the headlight 13. Knuckle guards 8 and rearview mirrors 7 are mounted on respective left and right steering handles 6. A pair of left and right fog lamps 14 are mounted in positions on lower portion of the side cowls 5 outwardly of the front fork legs 16 in vehicle widthwise directions. A front fender 36 for preventing mud from splashing onto the vehicle body is installed above the front wheel WF.

A rear frame 29 that supports a fuel tank 28, etc. is mounted on a rear portion of the vehicle frame 2. The rear frame 29 has left and right portions covered with a seat cowl 31 over which there are disposed a rider's seat 27 and a passenger's seat 30. A tail light device 32 is mounted on the rear end of the seat cowl 31, and rear direction indicating devices 33 are supported on a rear fender 34 that extends rearwardly and downwardly from the seat cowl 31.

As illustrated in FIGS. 3 and 4, a front brake lever 39 and a handle switch 38 are mounted on the right steering handle 6, and a clutch lever 41 and a handle switch 40 are mounted on the left steering handle 6. A meter device 37 is disposed between the left and right steering handles 6. A number plate holder 42 is mounted on the rear fender 34.

The main stand 22 mainly includes left and right main pipe sections 22a curved in a substantially U shape and a reinforcing pipe 22c coupling the left and right main pipe sections 22a. When stored, the main stand 22 is kept in a storage position under the resiliency of a return spring. To use the main stand 22, a foot step 22b of the main stand 22 is trod on to bring the distal ends of the main pipe sections 22a into contact with the ground, and while the foot step 22b is being trod on, the rear portion of the vehicle body is lifted upwardly to cause the main stand 22 to swing into its usage position, making the vehicle body stand still on its own with the rear wheel WR off the ground. A rubber damper 130 has a mount 22d provided on the main pipe section 22a on the right side of the vehicle body, of the main stand 22. When the main stand 22 is stored, the rubber damper 130 is held in abutment against a given portion of the muffler 26 for thereby absorbing shocks produced during being stored and vibrations produced during traveling.

Figure 5:
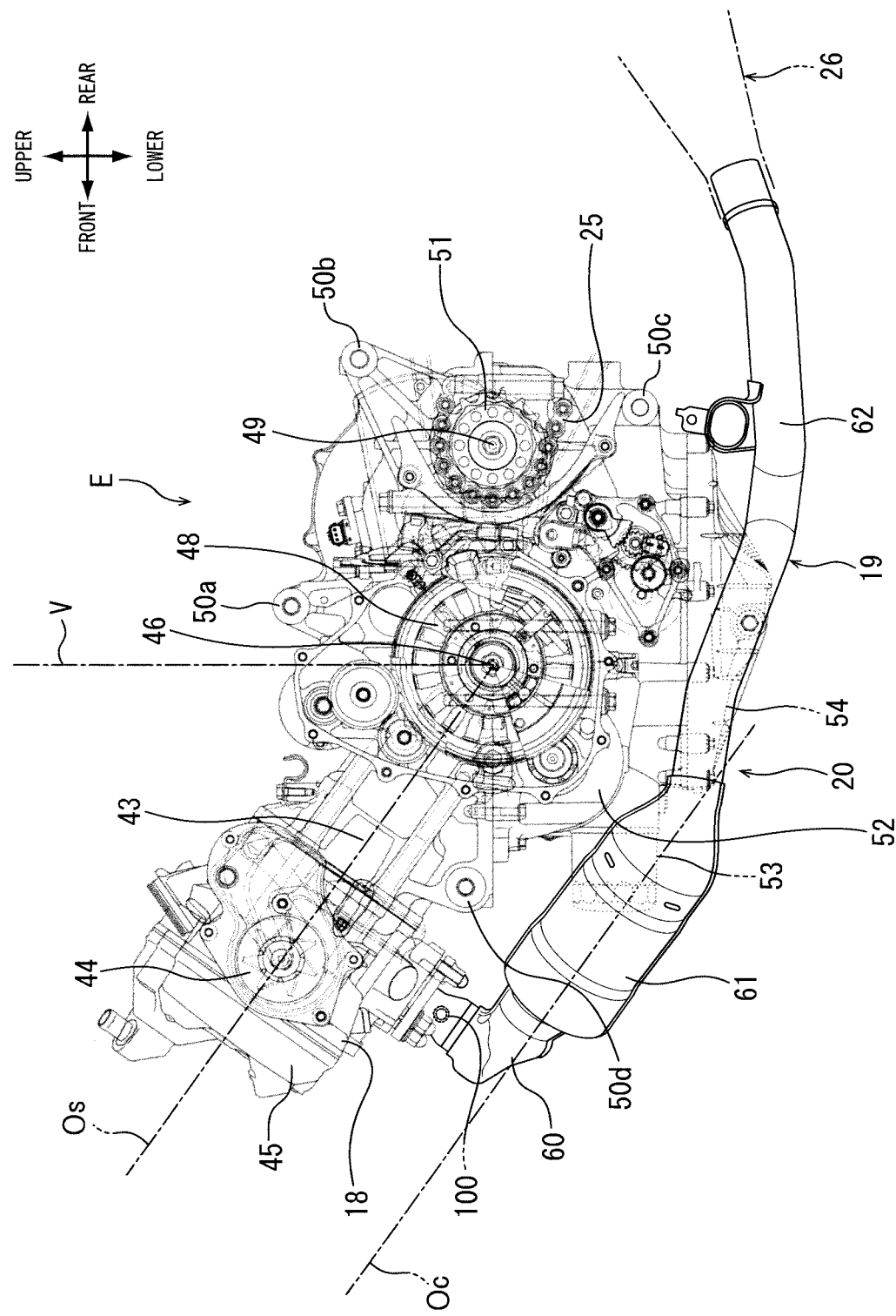
FIG. 5 is a left-hand side elevational view of an engine with the exhaust device mounted thereon.

FIG. 5 is a left-hand side elevational view of the engine E with the exhaust device 20 mounted thereon. The engine E includes a parallel two-cylinder gasoline internal combustion engine with cylinders 43 having a cylinder axis Os largely inclined forwardly of the vehicle body with respect to a vertical direction V. In FIG. 5, the generator cover Ea and the drive sprocket cover Eb illustrated in FIG. 1 are omitted from illustration. The engine E is supported on the vehicle frame 2 by an upper hanger 50a, a rear hanger 50b, and a lower hanger 50c of a crankcase 52, and suspended from the hanger frame 17 by a front hanger 50d formed on a cylinder block 43. The cylinder head 18 with an engine coolant pump 44 mounted thereon is fixed to an upper portion of the cylinder block 43, and a cylinder head cover 45 is fixed to an upper portion of the cylinder head 18.

The engine E includes a crankshaft 46 having a left end to which an alternating current generator (ACG) generator 48 is fixed for rotation in unison with the crankshaft 46. Rotary driving power from the crankshaft 46 is transmitted to a transmission, not illustrated, made up of a plurality of gear pairs provided between a main shaft and a countershaft 49, delivered out from a drive sprocket 51 fixed to the left end of the countershaft 49, and transmitted therefrom to the drive chain 25. An oil pan 54 is secured to the bottom of the crankcase 52, and an oil filter 53 is mounted on a front surface of the crankcase 52.

The exhaust device 20 has the pipe section 19 for guiding the exhaust gas rearwardly, and the muffler 26 connected to the rear end of the pipe section 19. The pipe section 19, which is made of a steel material such as stainless steel or the like, includes an outlet pipe 60 connected to the exhaust port of the cylinder head 18, a larger-diameter portion 61 whose diameter is increased to house a catalyzer therein, and an intermediate pipe 62 coupled to the rear end of the larger-diameter portion 61 for guiding the exhaust gas to the muffler 26.

The pipe section 19 is positioned on the left side of the crankcase 52 in the vehicle widthwise direction such that the larger-diameter portion 61 lies clear of the oil filter 53 and the oil pan 54, and is curved to the right side in a vehicle widthwise direction midway at the intermediate pipe 62 and connected to the muffler 26 disposed on the right side in the vehicle widthwise direction. A first oxygen sensor 100 for detecting the oxygen concentration in the exhaust gas is mounted on the outlet pipe 60 at a position immediately behind the junction with the exhaust port. The larger-diameter portion 61 is positioned below the cylinder block 43 of the engine E and in front of the crankcase 52.

According to the present embodiment, the larger-diameter portion 61 has an axis Oc substantially parallel to the cylinder axis Os of the engine E that are largely inclined forwardly of the vehicle body with respect to the vertical direction V. The outlet pipe 60 connected to the cylinder head 18 is bent from its junction substantially at a right angle rearwardly and downwardly with respect to the vehicle body and is connected to the larger-diameter portion 61.

Figure 6:
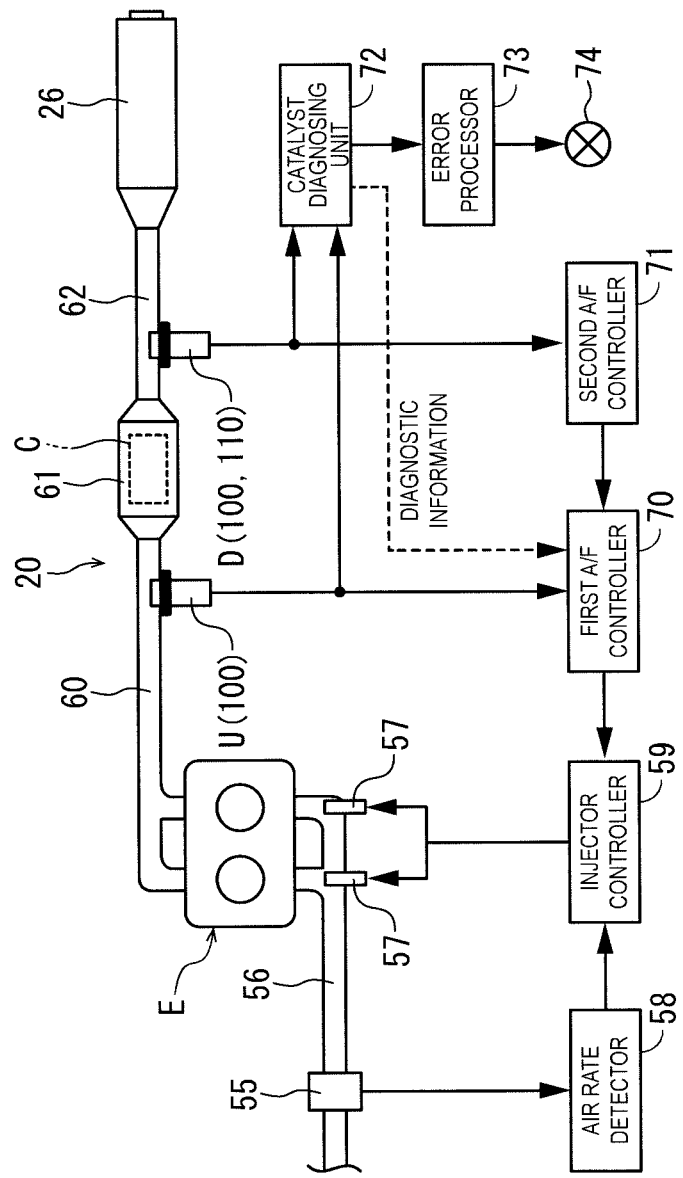
FIG. 6 is a block diagram illustrating the relationship between the engine and oxygen sensors.
Figure 8A:
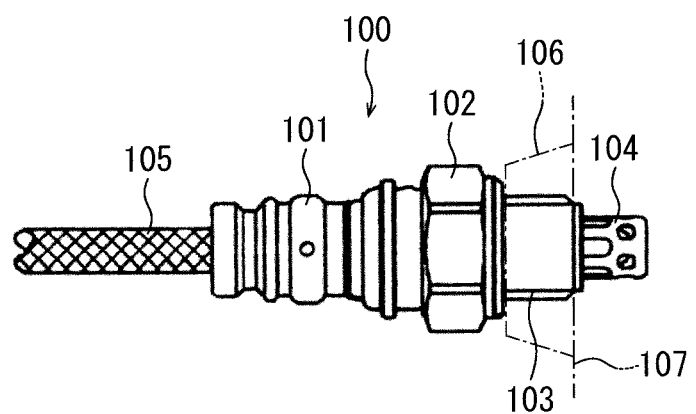
FIG. 8A and FIG. 8B are front elevational views of oxygen sensors mounted on the exhaust device.
Figure 8B:
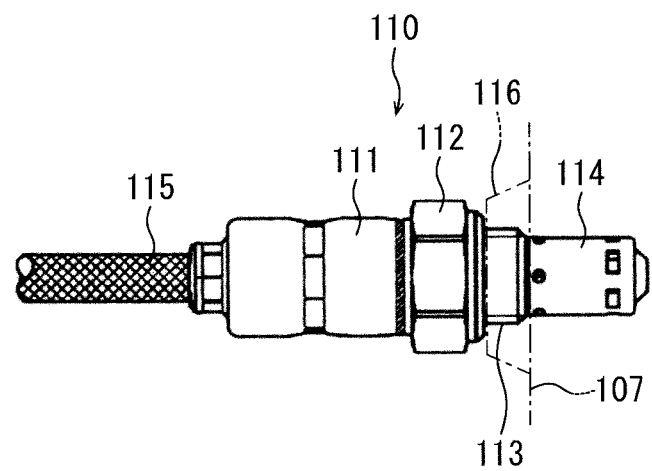

FIG. 6 is a block diagram illustrating the relationship between the engine and oxygen sensors. FIG. 7 is a flowchart of a catalyst deterioration detection control sequence, and FIG. 8A and FIG. 8B are front elevational views of oxygen sensors mounted on the exhaust device 20. The exhaust device 20 has an upstream oxygen sensor U positioned upstream of a catalyzer C and a downstream oxygen sensor D positioned downstream of the catalyzer C, for detecting deterioration of the catalyzer C that is housed in the larger-diameter portion 61.

As illustrated in FIG. 8A and FIG. 8B, the oxygen sensors include lean air/fuel ratio (LAF) sensors capable of linearly detecting a change in the oxygen concentration and oxygen sensors ($O_2$ sensors) capable of detecting only when the air-fuel ratio is a stoichiometric air-fuel ratio because their output value is inverted as it changes across the stoichiometric air-fuel ratio. Of these sensors, the so-called oxygen sensors that are relatively inexpensive compared with the expensive LAF sensors are often used on saddle-type vehicles such as motorcycles or the like. Furthermore, the oxygen sensors include a heaterless oxygen sensor 100 illustrated in FIG. 8A and a heater-mounted oxygen sensor 110 illustrated in FIG. 8B.

The heaterless oxygen sensor 100 and the heater-mounted oxygen sensor 110 are selectively used depending on whether the location where they can be installed is more likely to be heated by engine heat. Specifically, the heaterless oxygen sensor 100 is used in a location which is close to the engine E and that quickly reaches a high-temperature state wherein the zirconia element of the oxygen sensor is activated. On the other hand, the heater-mounted oxygen sensor 110 that is more expensive is used in a position which is remote from the engine E and hence that requires the zirconia element to be positively heated by a heater.

The heaterless oxygen sensor 100 is mounted on an exhaust pipe 107 such that a sensor unit 104 thereof projects into the exhaust pipe 107, by threading an externally threaded portion 103 into a mount boss 106 and fastening a nut 102 that is integral with a main body 101. A cable 105 for outputting a sensor signal is connected to the end of the main body 101. The heaterless oxygen sensor 100 has such features that it is of a simple structure, made up of a small number of parts, and of excellent durability.

The heater-mounted oxygen sensor 110 is mounted on the exhaust pipe 107 such that a sensor unit 114 thereof with a built-in ceramic heater projects into the exhaust pipe 107, by threading an externally threaded portion 113 into a mount boss 116 and fastening a nut 112 that is integral with a main body 111, which is larger in diameter than the heaterless oxygen sensor 100. A cable 115 for outputting a sensor signal is connected to the end of the main body 111. The heater-mounted oxygen sensor 110 has such features that the zirconia element thereof can quickly be activated even if it is far from a heat source, though it is made up of a large number of parts and highly costly because of the built-in heater, and slightly lower in water coverage resistance.

In the exhaust device 20 according to the present invention, as illustrated in the block diagram of FIG. 6, the heaterless oxygen sensor 100 is mounted in a given position (the position illustrated in FIG. 5) upstream of the catalyzer C, and either one of the heaterless oxygen sensor 100 and the heater-mounted oxygen sensor 110, depending on the position where it is installed, is applied downstream of the catalyzer C.

Injectors 57 as fuel injection devices are provided on an intake pipe 56 of the engine E, and an intake air rate sensor 55 is disposed upstream thereof. A sensor signal from the intake air rate sensor 55 is input to an air rate detector 58. As described above, the upstream oxygen sensor U (heaterless oxygen sensor 100) is mounted on the outlet pipe 60 connected to the exhaust port of the engine E. A sensor signal from the upstream oxygen sensor U is input to a first air/fuel ratio (A/F) controller 70.

An injector controller 59 controls the injectors 57 to burn at an appropriate air-fuel ratio on the basis of information representing a throttle action and an engine rotational speed and signals from the air rate detector 58 and the first A/F controller 70.

The downstream oxygen sensor D is provided downstream of the catalyzer C, and a sensor signal from the downstream oxygen sensor D is input to a second A/F controller 71. The sensor signals from the upstream oxygen sensor U and the downstream oxygen sensor D are input to a catalyst diagnosing unit 72. The catalyst diagnosing unit 72 diagnoses and detects a deteriorated state of the catalyzer C on the basis of the sensor signals from the upstream oxygen sensor U and the downstream oxygen sensor D, and transmits to an error processor 73. If the deteriorated degree of the catalyzer C does not satisfy a predetermined standard, then the error processor 73 turns on or blinks an indicator 74, indicating the error to the rider. The indicator 74 may be provided in the meter device 37 or the like of the motorcycle 1.

If the catalyst diagnosing unit 72 decides that the catalyzer C has deteriorated, then diagnostic information is input therefrom to the first A/F controller 70. In this case, for example, an output limiting control process for reducing a fuel injection rate is carried out to suppress the generation of substances to be purified by the catalyzer C.

The catalyst deterioration detection control sequence will be described below with reference to the flowchart illustrated in FIG. 7. When the engine E starts to operate in step S1, the output of the upstream oxygen sensor U is detected in step S2, and then the output of the downstream oxygen sensor D is detected in step S3.

In step S4, it is determined whether the engine E has reached a stable operating state. If the decision is affirmative in step S4, e.g., if the temperature of the coolant of the engine E has reached a predetermined temperature, deciding that the warm-up operation is finished, then the sequence goes to step S5. If the decision is negative in step S4, then the sequence goes back to step S2.

In step S5, a catalyst deterioration diagnosing process is carried out based on the two sensor outputs from the upstream oxygen sensor U and the downstream oxygen sensor D. The catalyst deterioration diagnosing process focuses on the relationship between the sensor output of the upstream oxygen sensor U and the sensor output of the downstream oxygen sensor D, and is performed by detecting a change caused by deterioration of the catalyzer C. Specifically, a passive method such as a counting method for counting the number of times that the downstream oxygen sensor D exhibits a predetermined change within a predetermined time, an amplitude ratio method for comparing the amplitudes of the sensor output of the upstream oxygen sensor U and the sensor output of the downstream oxygen sensor D with each other, an amplitude estimating method for estimating a behavior of the sensor output of the downstream oxygen sensor D from a behavior of the sensor output of the upstream oxygen sensor U and comparing the estimated behavior with an actually measured value, or the like may be applied.

For example, according to a method that focuses on a reduction in the adsorption rate of oxygen due to deterioration of the catalyst, for feedback-controlling the air-fuel ratio based on the output of the downstream oxygen sensor, since the response time until the oxygen concentration in the exhaust gas changes under the feedback control varies under the influence of deterioration, the deteriorated state of the catalyst can be determined by determining whether the period of change in the output of the downstream gas sensor falls under a predetermined catalyst deteriorating condition. According to this method, even when the internal combustion engine starts to operate at a low temperature, the feedback control of the air-fuel ratio can be carried out in an early stage, and the deteriorated state of the catalyst can be determined. Aside from the above passive method, an active method such as a Cmax method, a CMD method, or the like for deliberately changing the oxygen concentration in the exhaust gas is also applicable to the catalyst deterioration diagnosing process.

Figure 9:
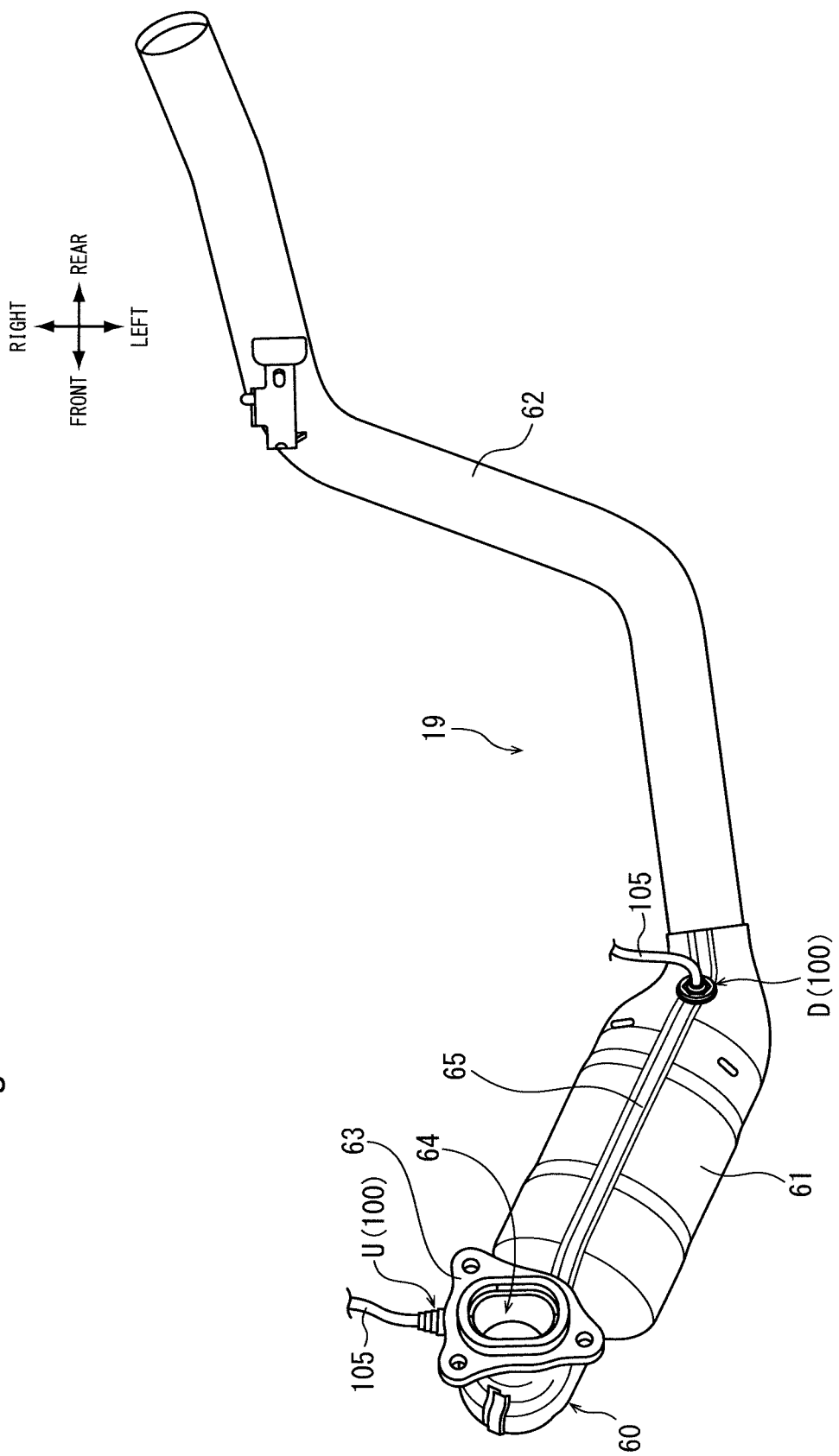
FIG. 9 is a plan view of a pipe section of the exhaust device.
Figure 10:
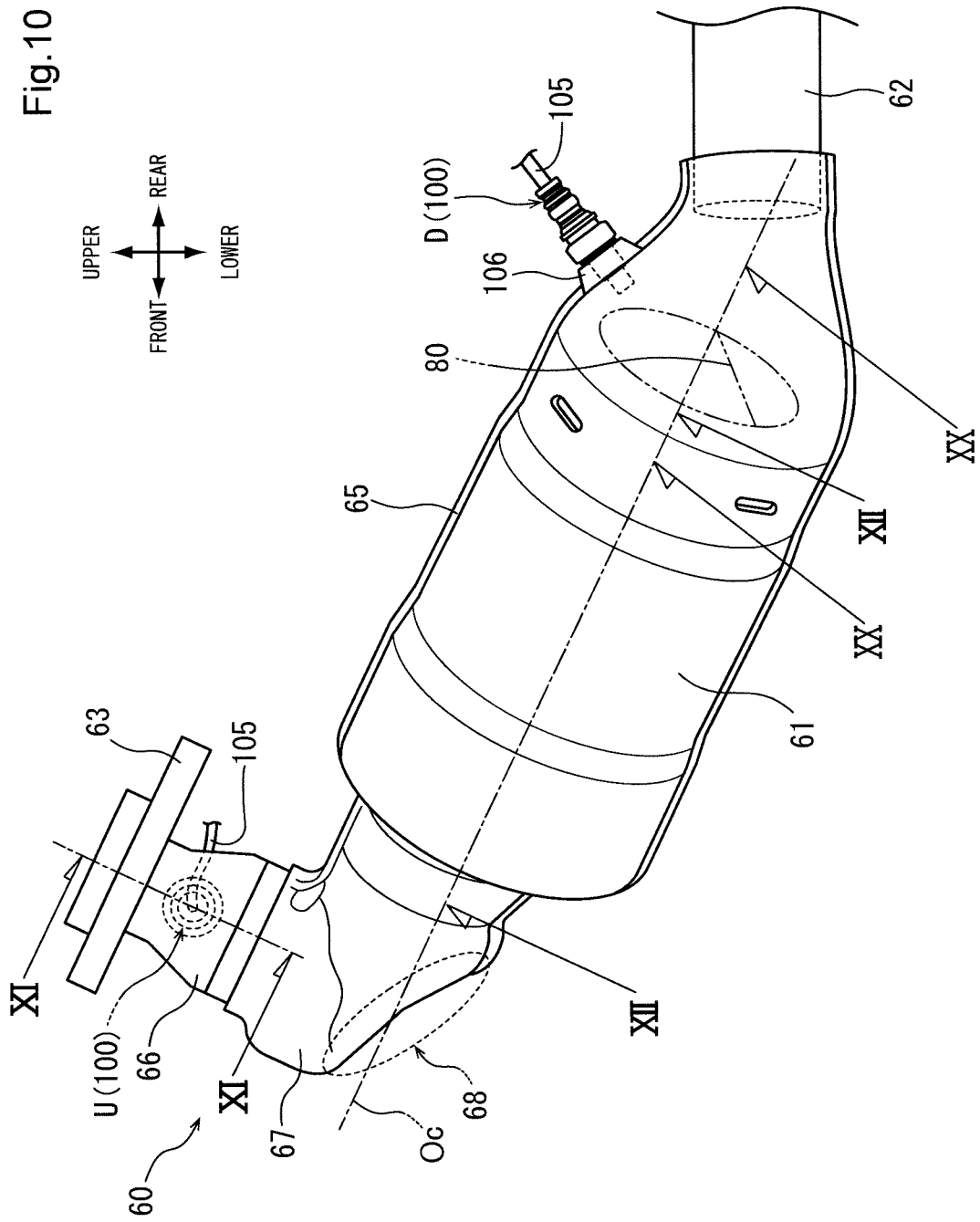
FIG. 10 is an enlarged front elevational view of a larger-diameter portion.
Figure 11:
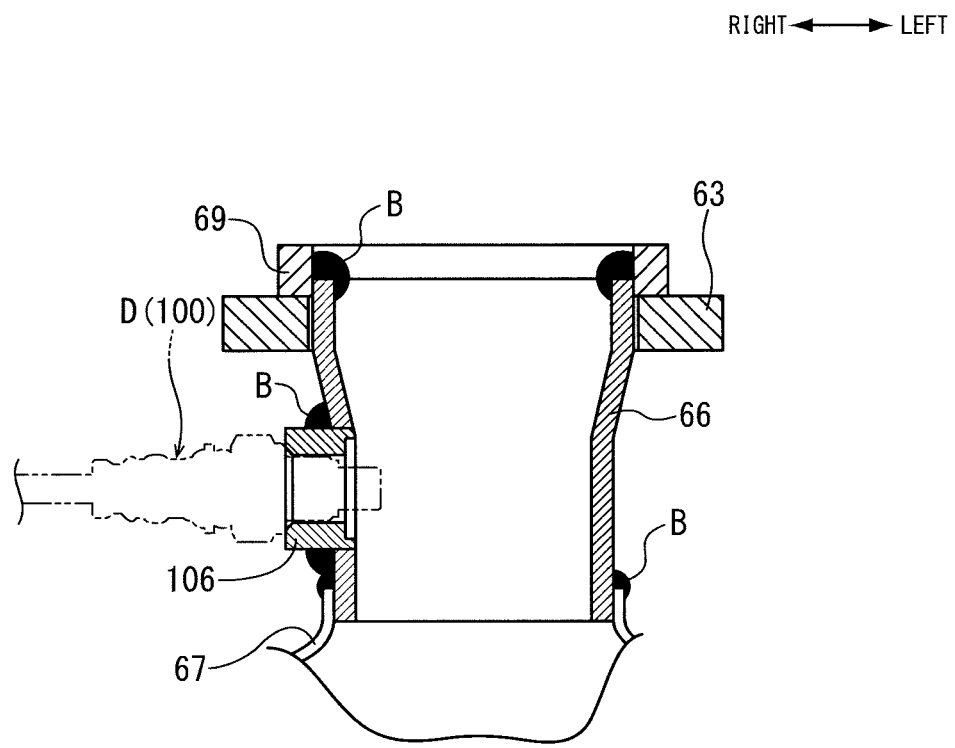
FIG. 11 is a cross-sectional view taken along line XI-XI of FIG. 10.

FIG. 9 is a plan view of the pipe section 19 of the exhaust device 20. FIG. 10 is an enlarged front elevational view of the larger-diameter portion 61, and FIG. 11 is a cross-sectional view taken along line XI-XI of FIG. 10. The exhaust device 20 according to a first embodiment of the present invention is characterized in that the downstream oxygen sensor D includes the heaterless oxygen sensor 100 and is disposed in a position near the rear end of the larger-diameter portion 61 that houses the catalyzer C therein.

The outlet pipe 60 includes a smaller-diameter portion 66 and a bent portion 67. The smaller-diameter portion 66 is of such a shape that it becomes gradually larger in diameter from an oblong inlet hole 64 therein that matches the shape of the exhaust port and changes to a circular cross-sectional shape. The upstream oxygen sensor U is mounted on the right side of the smaller-diameter portion 66 in the vehicle widthwise direction and oriented outwardly from the center in the vehicle widthwise direction, and disposed in a position less exposed to external view. The area from the smaller-diameter portion 66 up to the larger-diameter portion 61 is covered with the exhaust pipe cover 5a illustrated in FIG. 1 that is disposed in front thereof, so that the upstream oxygen sensor U is made much less exposed to external view.

As illustrated in FIG. 11, a joint ring 69 is fixed to the distal end of the smaller-diameter portion 66 in abutment against a gasket by a weld bead B, and a flange 63 engages a downstream side thereof. The bent portion 67 is fixed to the rear end of the smaller-diameter portion 66 by a weld bead B. A mount boss 106 for the upstream oxygen sensor U is fixed to the right side of the smaller-diameter portion 66 in the vehicle widthwise direction by a weld bead B.

The bent portion 67 is of such a shape that it is progressively greater in diameter while bending the direction of the exhaust gas at approximately 90 degrees from a forwardly downward direction to a rearwardly downward direction in order to connect the smaller-diameter portion 66 and the larger-diameter portion 61 to each other. The bent portion 67 has a recessed portion 68 as a recessed-projected portion that is recessed upwardly and rearwardly with respect to the vehicle body. The recessed portion 68 provides a projected portion for repelling the exhaust gas in many directions within the tubular passage, so that even though the direction of the passageway of the exhaust gas is bent at approximately 90 degrees, the passageway of the exhaust gas is not biased, but the exhaust gas can pass through the catalyzer C in its entirety. The recessed portion 68 may be modified into any of various shapes such as a projected shape, a wavy shape, etc. capable of dispersing the exhaust gas.

The larger-diameter portion 61 that houses the catalyzer C therein is provided rearwardly of the bent portion 67. The intermediate pipe 62 is connected to the rear end of the larger-diameter portion 61. According to the present embodiment, the portion which ranges from the bent portion 67 to the larger-diameter portion 61 is of a so-called "assembled hollow structure" made up of left and right parts joined together. The assembled hollow structure has an upstanding mating region 65 on upper and lower portions of the bent portion 67 and the larger-diameter portion 61.

According to the present embodiment, the downstream oxygen sensor D is mounted on an inclined portion which is progressively smaller in diameter at a position near the rear end of the larger-diameter portion 61. A mount boss 106 is provided at a position through which the mating region 65 of the assembled hollow structure extends.

According to the present embodiment, since the downstream oxygen sensor D is mounted on the larger-diameter portion 61, the oxygen sensor is mounted in place by effectively utilizing a space that is provided by the larger-diameter portion 61 even on the saddle-type vehicle where much extra space is not available. With this layout, both the upstream oxygen sensor U and the downstream oxygen sensor D are positioned above the central line Oc of the larger-diameter portion 61 with respect to the vehicle body as viewed in side elevation of the vehicle body, so that both oxygen sensors are protected from jumping pebbles or the like, and the installed downstream oxygen sensor D does not affect the bank angle of the motorcycle 1.

An upstanding dispersion plate 80 as diffusing means for diffusing the exhaust gas that has passed through a position near a lower portion of the catalyzer C with respect to the vehicle body is disposed in the larger-diameter portion 61 downstream of the catalyzer C. It is provided to prevent the exhaust gas from gathering in a lower region at the junction with the intermediate pipe 62 and affecting measurement by the downstream oxygen sensor D provided on the upper portion of the larger-diameter portion 61 despite the fact that the angle of the passageway of the exhaust gas varies between the smaller-diameter portion 66 and the intermediate pipe 62.

Figure 12A:
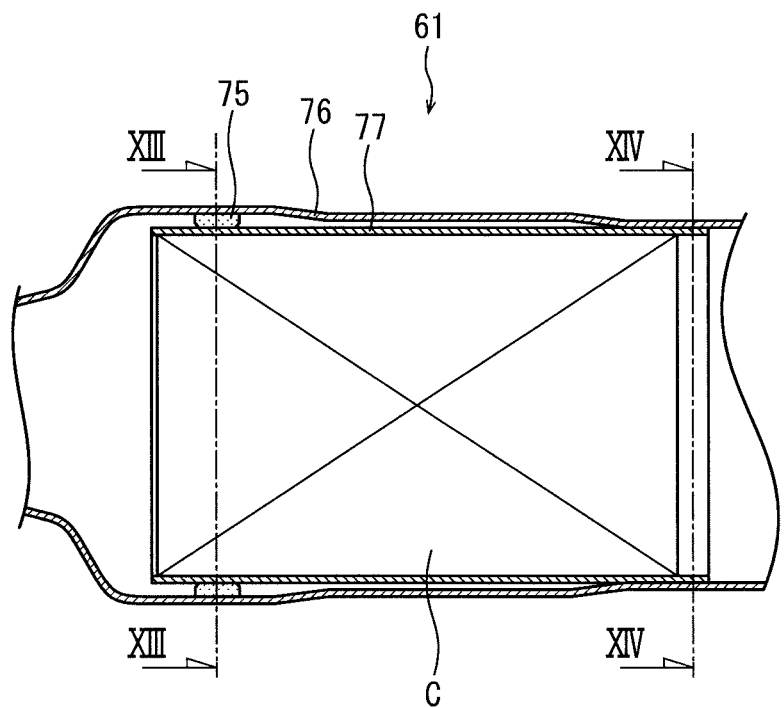
FIG. 12A and FIG. 12B are cross-sectional views taken along line XII-XII of FIG. 10.
Figure 12B:
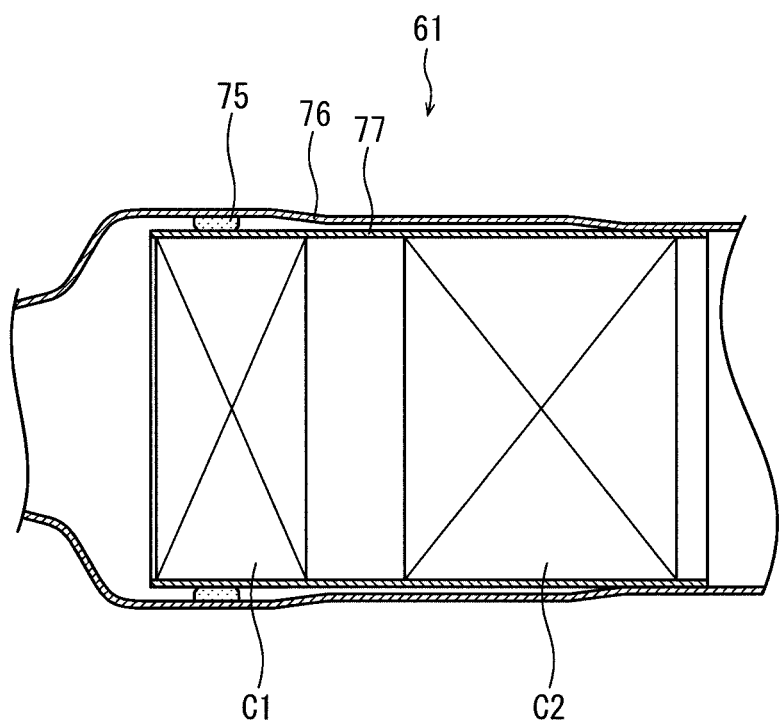

FIG. 12A and FIG. 12B are cross-sectional views taken along line XII-XII of FIG. 10. As illustrated in FIG. 12A, the larger-diameter portion 61 houses therein the catalyzer C in the form of a cylinder as a three-way catalyst including a ceramics honeycomb. An annular packing 75 that can be divided into two parts is enclosed between an outer shell 77 of the catalyzer C and an outer shell 76 of the larger-diameter portion 61 for preventing the exhaust gas from leaking rearwardly from between those outer shells.

As illustrated in FIG. 12B, the catalyzer C may be replaced with two catalyzers C1 and C2 which exhibit different characteristics in upstream and downstream regions. In this case, the downstream catalyzer C2 may be of such characteristics that it can be heated more easily than the upstream catalyzer C1, thereby shortening the time required for the overall catalyzer assembly to reach an activating temperature and making it possible to use the sensor output of the downstream oxygen sensor D at an earlier time.

Figure 13:
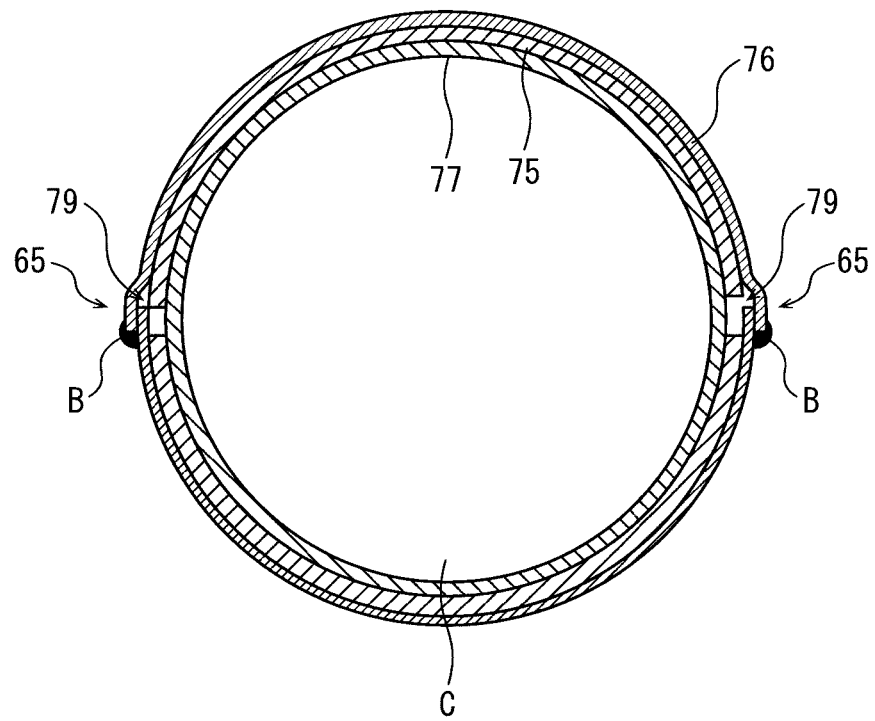
FIG. 13 is a cross-sectional view taken along line XIII-XIII of FIG. 12A.
Figure 14:
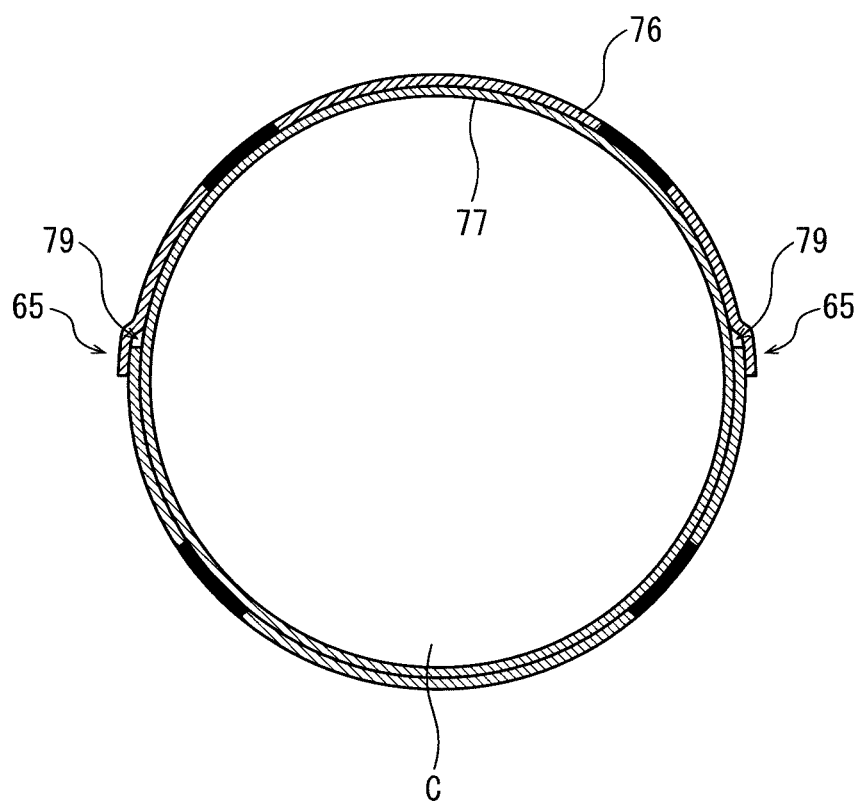
FIG. 14 is a cross-sectional view taken along line XIV-XIV of FIG. 12A.
Figure 15:
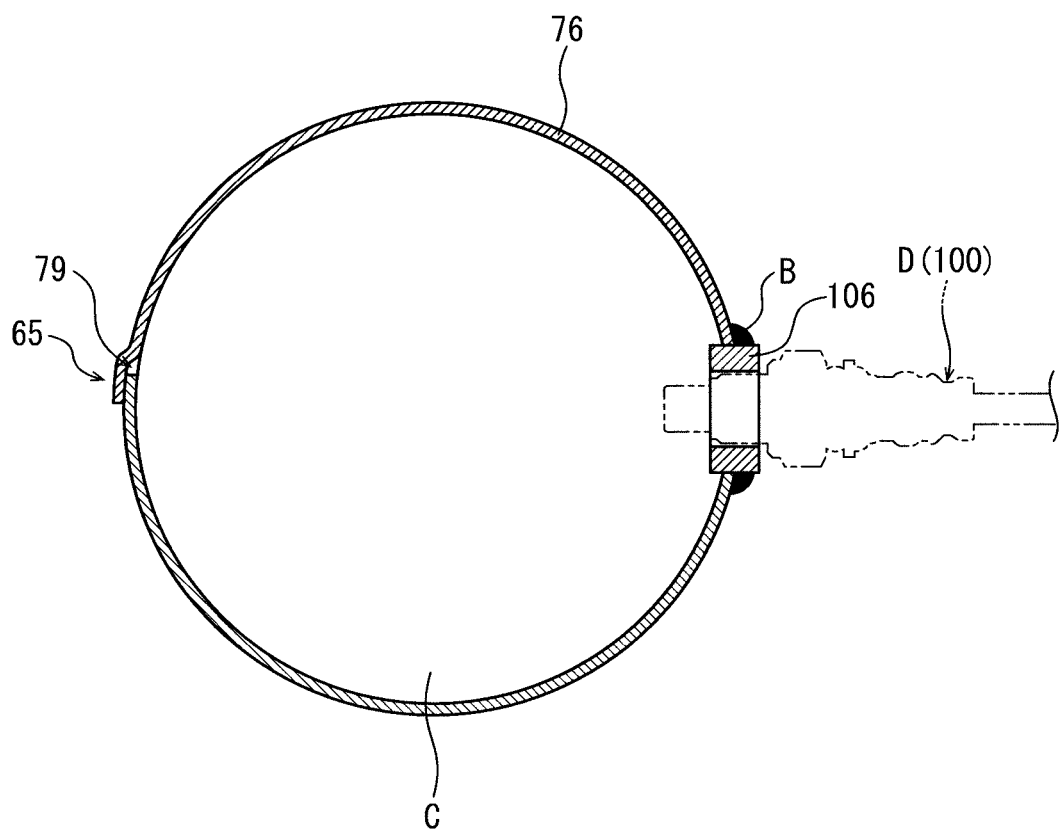
FIG. 15 is a cross-sectional view of a portion where the downstream oxygen sensor is mounted in position.

FIG. 13 is a cross-sectional view taken along line XIII-XIII of FIG. 12A. FIG. 14 is a cross-sectional view taken along line XIV-XIV of FIG. 12A, and FIG. 15 is a cross-sectional view of a portion where the downstream oxygen sensor D is mounted in position. As described above, the annular packing 75 that can be divided into two parts is enclosed between the outer shell 77 of the catalyzer C and the outer shell 76 of the larger-diameter portion 61. The assembled hollow structure of the outer shell 76 of the larger-diameter portion 61 has the mating region 65 of two parts fixed by the weld bead B from outside, and hence it is difficult to remove a clearance 79 formed on an inner circumferential surface. Even if the annular packing 75 includes a circular integral component, an exhaust gas that does not pass through the catalyzer C flows downstream through the clearance 79, possibly affecting the sensor output of the downstream oxygen sensor D by the exhaust gas. According to the present embodiment, as illustrated in FIG. 15, since the mount boss 106 is provided at the position through which the mating region 65 of the assembled hollow structure extends, the mount boss 106 closes the clearance 79, preventing the exhaust gas that does not pass through the catalyzer C from affecting the sensor output.

Figure 16:
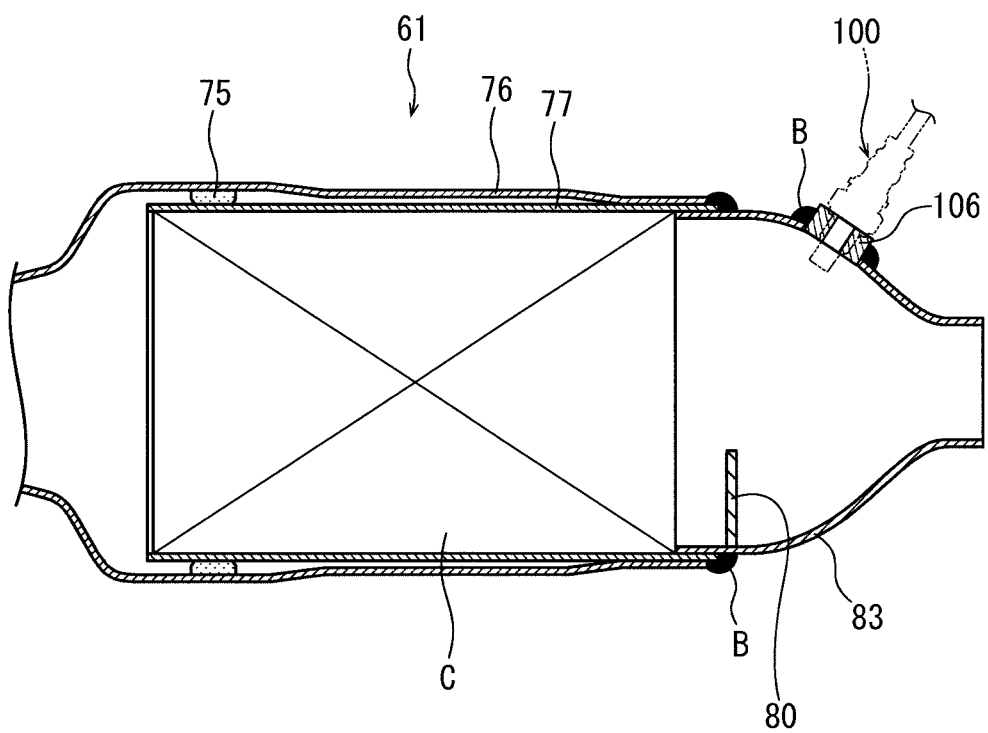
FIG. 16 is a cross-sectional view illustrating the structure of a larger-diameter portion according to a modification of the present embodiment.

FIG. 16 is a cross-sectional view illustrating the structure of a larger-diameter portion 61 according to a modification of the present embodiment. According to the present modification, the larger-diameter portion 61 includes a front portion having an assembled hollow structure and a rear portion 83 in the form of an integral component formed by a drawing process or a winding process. Specifically, the rear end of the outer shell 76 of the larger-diameter portion 61 is shortened into positional alignment with the rear end of the outer shell 77 of the catalyzer C, and the rear portion 83 which is a separate component is fixed thereto by a process of so-called welding three overlapping sheets, thereby forming the larger-diameter portion 61.

With this construction, though the number of parts used grows, the ease with which to assemble the parts is increased by the process of welding three overlapping sheets, and the dispersion plate 80 described above can be installed easily. As the downstream oxygen sensor D is installed on the rear portion of the integral component, the possibility that the exhaust gas that passes through the clearance 79 of the assembled hollow structure will affect the sensor output can be reduced.

Figure 17:
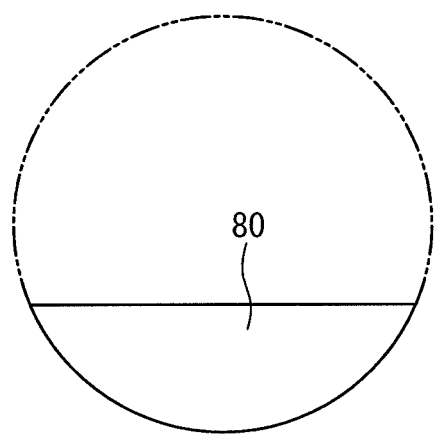
FIG. 17 is a front elevational view of a dispersion plate.
Figure 18:
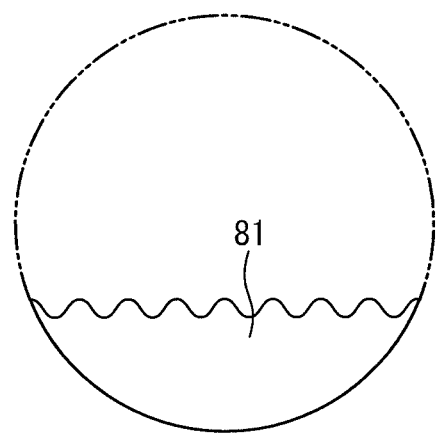
FIG. 18 is a front elevational view of a dispersion plate according to a modification.
Figure 19:
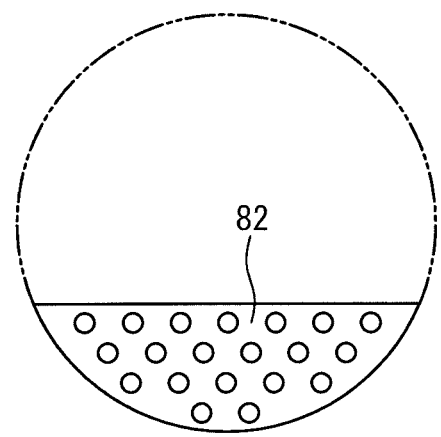
FIG. 19 is a front elevational view of a dispersion plate according to a second modification.

FIG. 17 is a front elevational view of the dispersion plate 80. FIG. 18 is a front elevational view of a dispersion plate 81 according to a modification, and FIG. 19 is a front elevational view of a dispersion plate 82 according to a second modification. As described above, the dispersion plate 80 serves to disperse the exhaust gas so that the exhaust gas does not gather in the low area at the junction with the intermediate pipe 62 despite the fact that the angle of the passageway of the exhaust gas varies in the portion ranging from the larger-diameter portion 61 to the intermediate pipe 62. The shape thereof may be modified in various ways in order to serve the purpose of the dispersing means. The straight edge may be changed to a wavy shape as illustrated in FIG. 18, and a plurality of through holes are provided as illustrated in FIG. 19. Furthermore, the straight edge may be of a peak shape or a valley shape. The dispersing means may be in the form of recession and projection on the wall surface of the larger-diameter portion 61, rather than an upstanding dispersion plate.

Figure 20:
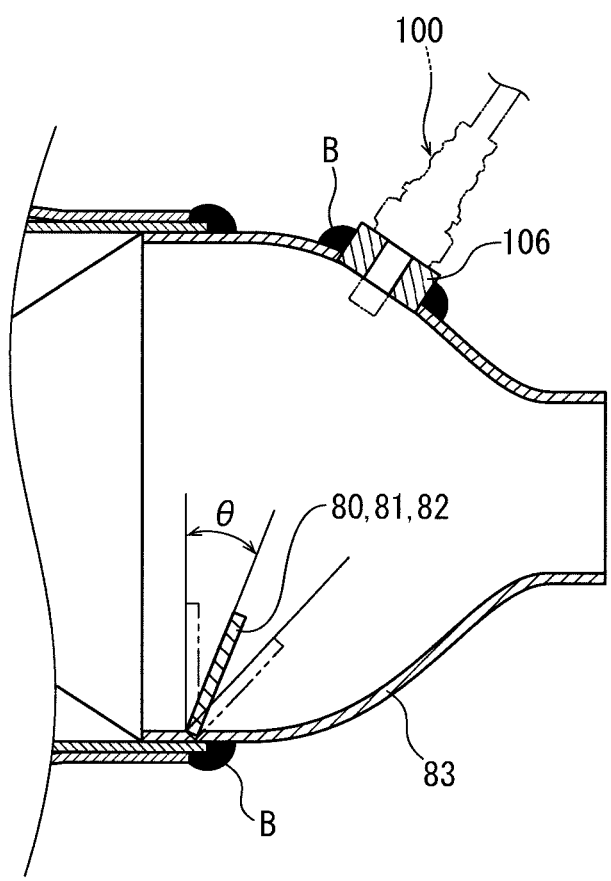
FIG. 20 is a cross-sectional view taken along line XX-XX of FIG. 10.

FIG. 20 is a cross-sectional view taken along line XX-XX of FIG. 10. The dispersion plates 80, 81, and 82 referred to above are inclined rearwardly with respect to the vehicle body through an angle θ from an upstanding state perpendicular to the inner circumferential surface of the rear portion 83 and fixed thereto as inclined in order to efficiently disperse the exhaust gas that has passed through the catalyzer C. The angle θ is set to a desired value in the range of $0°<θ≤90°$ in view of the structure of the pipe section 19 and the displacement of the engine E, etc.

A second embodiment of the present invention will be described below. The second embodiment is characterized in that the downstream oxygen sensor D includes the heater-mounted oxygen sensor 110 and is disposed in a position near the front end of the muffler 26.

Figure 21:
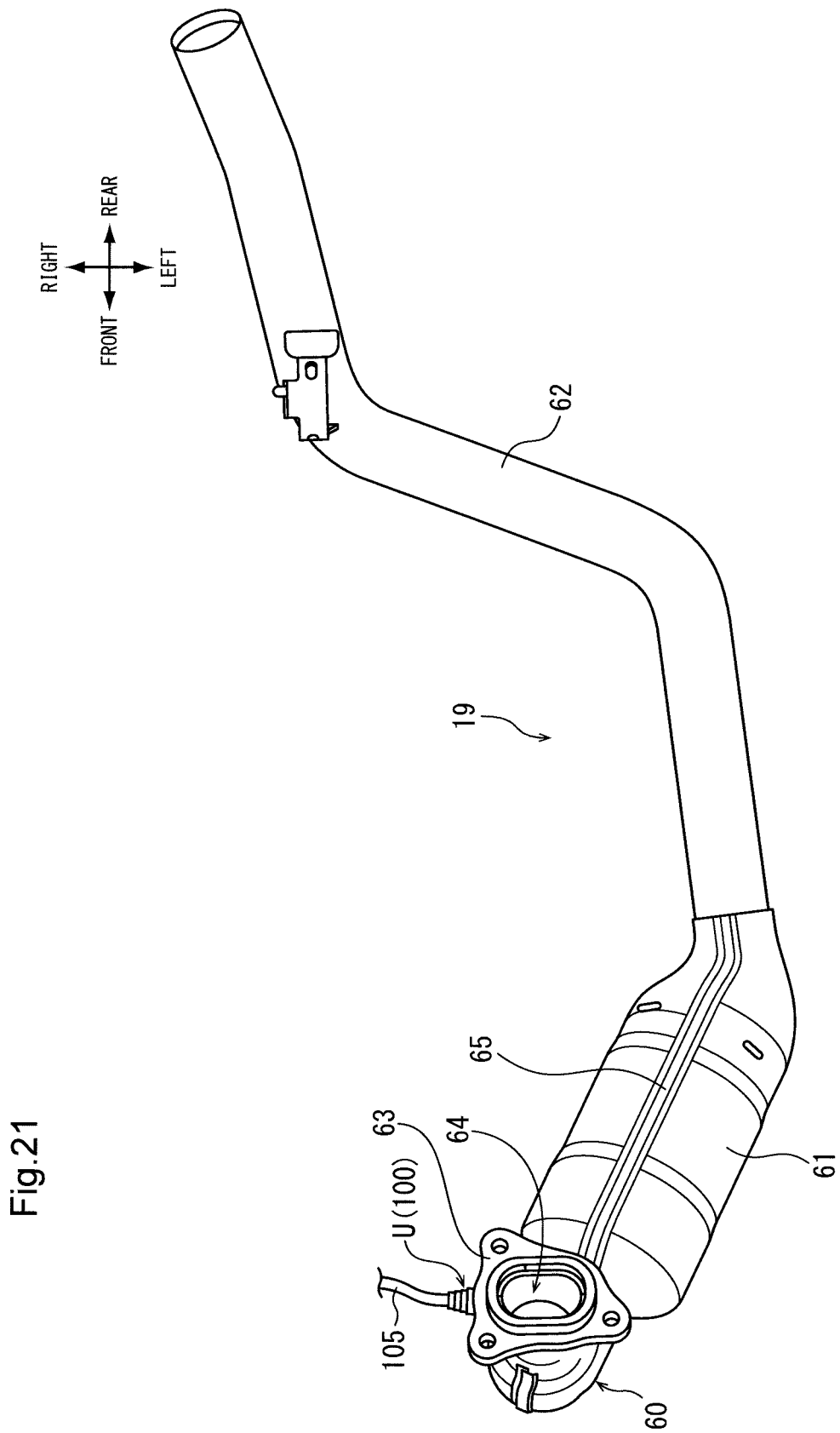
FIG. 21 is a plan view of a pipe section according to the second embodiment of the present invention.
Figure 22:
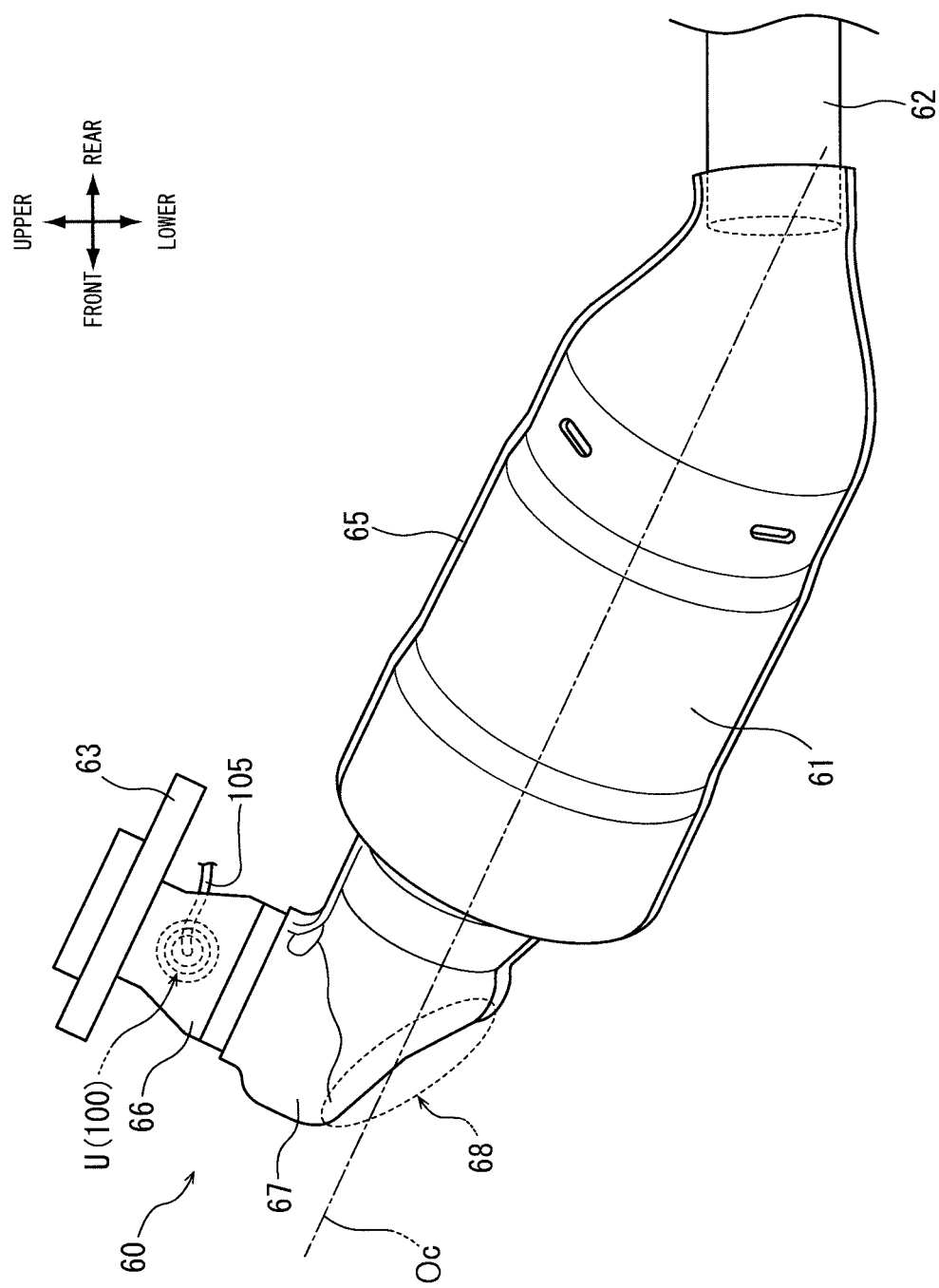
FIG. 22 is an enlarged front elevational view of a larger-diameter portion according to the second embodiment of the present invention.

FIG. 21 is a plan view of a pipe section 19 according to the second embodiment of the present invention. FIG. 22 is an enlarged front elevational view of a larger-diameter portion 61 according to the second embodiment of the present invention. According to the present embodiment, the downstream oxygen sensor D is mounted on the muffler 26, so that the downstream oxygen sensor D is not mounted on the larger-diameter portion 61, and the number of steps of producing the larger-diameter portion 61 is reduced. As the downstream oxygen sensor D is not present and the biased exhaust gas having passed through the catalyzer C does not affect the sensor output, the dispersion plate 80 is eliminated. The other structural details are shared by the pipe section 19 described above, and will not be described below.

Figure 23:
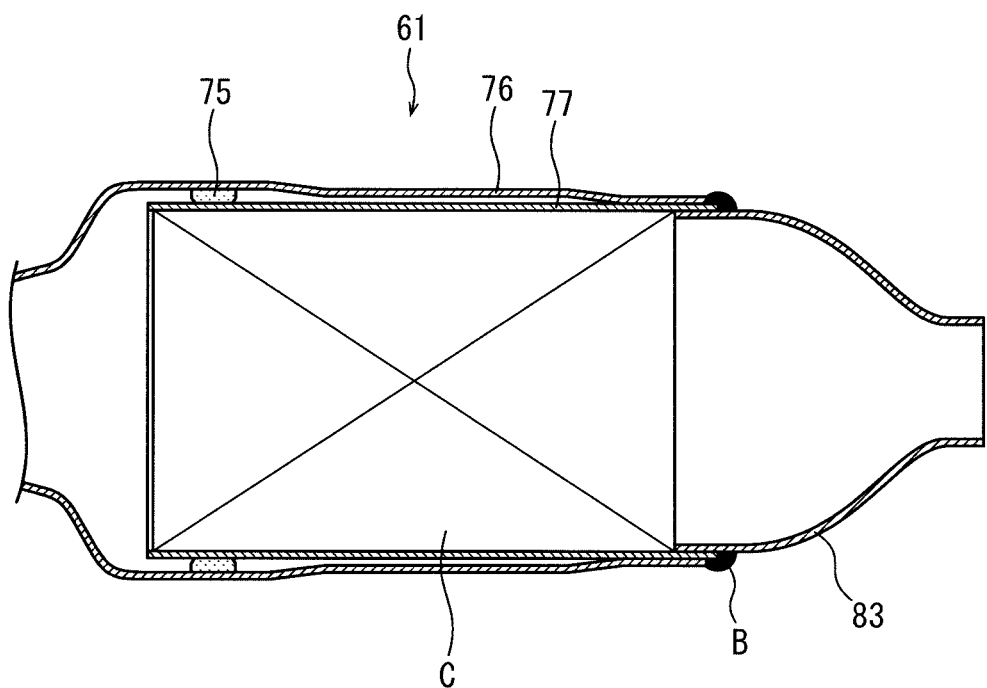
FIG. 23 is a cross-sectional view of a larger-diameter portion according to a modification of the second embodiment of the present invention.

FIG. 23 is a cross-sectional view of a larger-diameter portion 61 according to a modification of the second embodiment of the present invention. According to the present modification, the larger-diameter portion 61 includes a front portion having an assembled hollow structure and a rear portion 83 in the form of an integral component formed by a drawing process or a winding process. Specifically, the rear end of the outer shell 76 of the larger-diameter portion 61 is shortened into positional alignment with the rear end of the outer shell 77 of the catalyzer C, and the rear portion 83 which is a separate component is fixed thereto by a process of so-called welding three overlapping sheets, thereby forming the larger-diameter portion 61.

With this construction, though the number of parts used grows, the ease with which to assemble the parts is increased by welding three overlapping sheets, and the dispersion plate 80 described above can be installed easily. Furthermore, the exhaust gas that passes through the clearance 79 of the assembled hollow structure is prevented from flowing downstream without passing through the catalyzer C.

Figure 24:
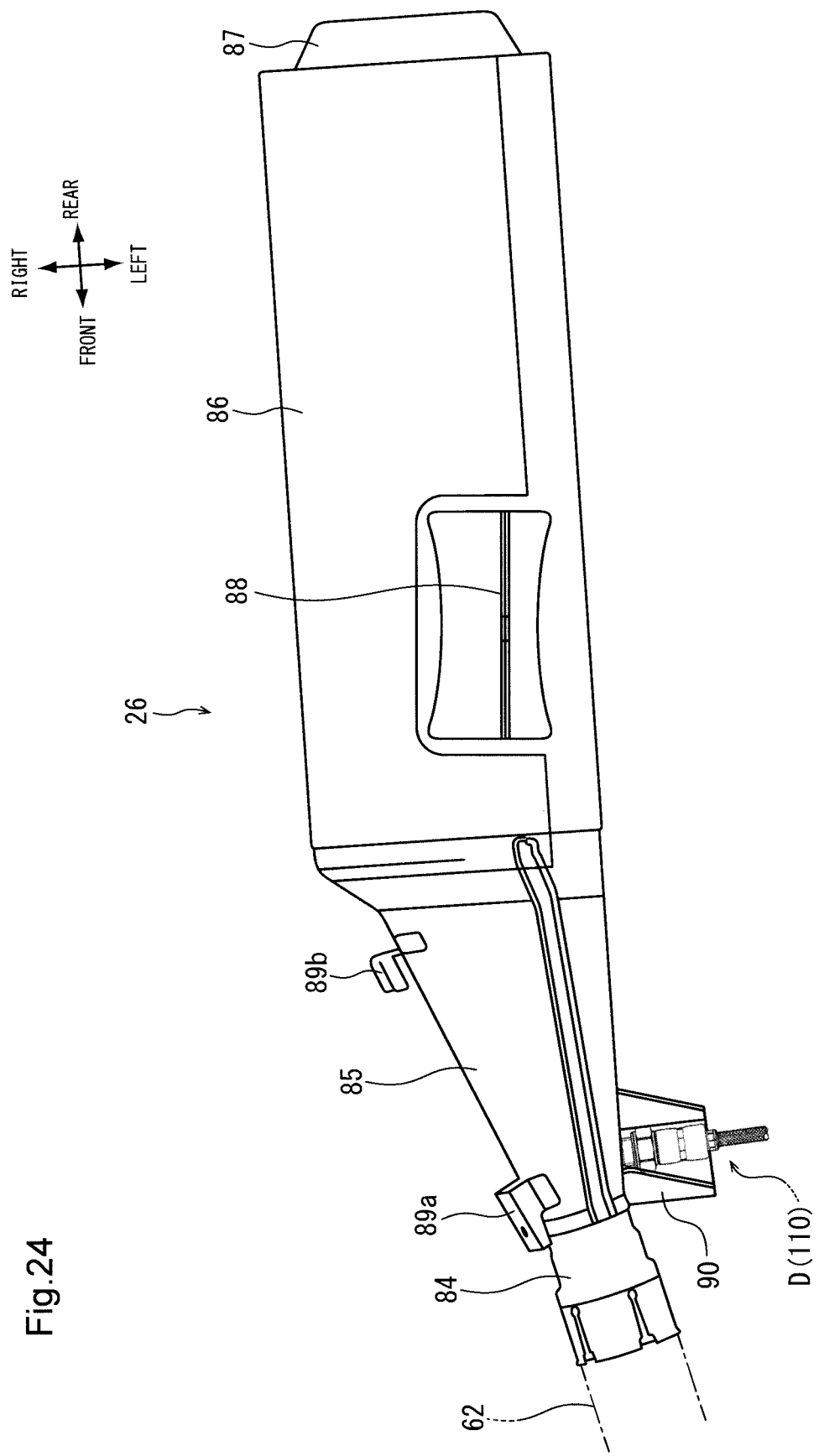
FIG. 24 is a plan view of a muffler.
Figure 25:
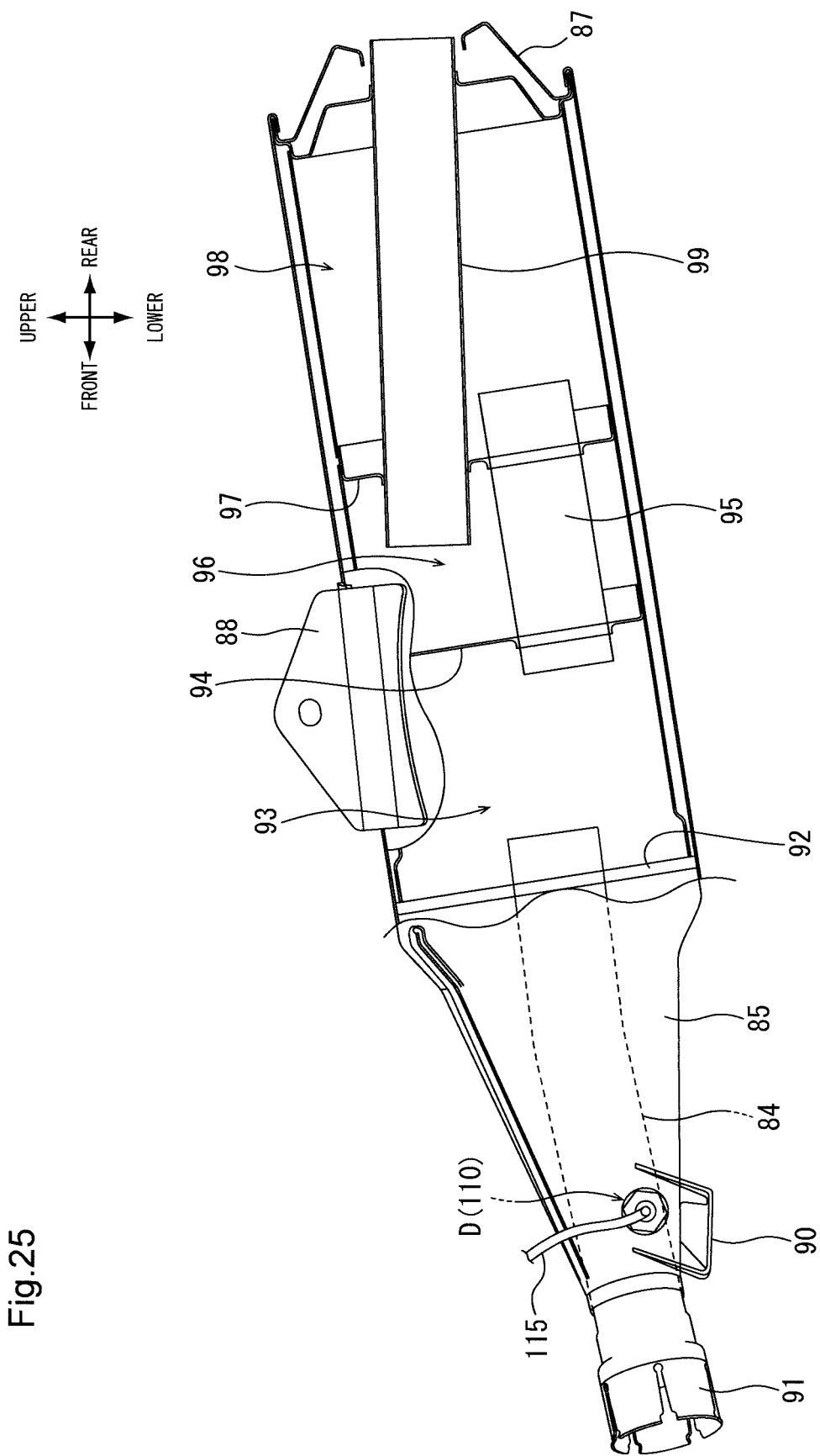
FIG. 25 is a side elevational view, partly in cross section, of the muffler.

FIG. 24 is a plan view of the muffler 26. FIG. 25 is a side elevational view, partly in cross section, of the muffler 26. The muffler 26 which is connected to the rear end of the intermediate pipe 62 includes a joint pipe 84, a tapered portion 85 which is progressively larger in diameter from the joint pipe 84, and a hollow cylindrical muffler portion 86. On the tapered portion 85, there are mounted mount stays 89a and 89b for mounting a heat guard, not illustrated, thereon, and a stand receiver 90 against which the rubber damper 130 of the main stand 22 will be held in abutment. A muffler stay 88 by which the muffler 26 is to be suspended from the rear frame 29 is provided on an upper surface of the muffler portion 86, and a muffler end 87 is provided on the rear end of the muffler portion 86.

According to the present embodiment, the upstream oxygen sensor U is provided on the outlet pipe 60, and the downstream oxygen sensor D is provided on the tapered portion 85 of the muffler 26. Since the position is spaced from the heat source and less liable to heat the oxygen sensor, the heater-mounted oxygen sensor 110 is used. Furthermore, the downstream oxygen sensor D is mounted on the inner side in the vehicle widthwise direction such that the downstream oxygen sensor D is accommodated in the stand receiver 90 which is formed of a plate-like member bend into a substantially U-shaped cross section. The downstream oxygen sensor D thus installed is less exposed to external view, and less subject to jumping pebbles and splashing water.

The stand receiver 90 is fixed in a position near the front end of the tapered portion 85 that covers the joint pipe 84 through which the exhaust gas is introduced into the muffler 26. Consequently, the downstream oxygen sensor is protected by the stand receiver 90 that is firmly fixed in order to bear the main stand 22 when it is stored, and the downstream oxygen sensor D that is provided in a position near the front end of the tapered portion 85 that covers the periphery of the joint pipe 84 for an enhanced appearance makes it easy for its sensor unit of the downstream oxygen sensor D to project into the joint pipe 84.

The portion on which the stand receiver 90 is mounted includes a slender pipe, and hence the possibility that the oxygen concentration in the pipe will be biased is low compared with a large-diameter portion such as the larger-diameter portion 61 on which the downstream oxygen sensor D is mounted. Therefore, the detection accuracy of the downstream oxygen sensor D is easy to maintain.

As illustrated in FIG. 25, the front end of the joint pipe 84 has a flange 91 by which to connect to the intermediate pipe 62. The joint pipe 84 has a rear end extending through the tapered portion 85 and inserted through a first partition 92 into a first expansion chamber 93. A second partition 94 is provided at the rear end of the first expansion chamber 93, dividing the first expansion chamber 93 from a second expansion chamber 96 through which a second pipe 95 extends. A third partition 97 supports the second pipe 95 and a third pipe 99, and is provided as an upstanding partition between the second expansion chamber 96 and a third expansion chamber 98. The exhaust gas that is introduced from the joint pipe 84 is silenced as it passes through the expansion chambers, and then discharged from the rear end of the muffler 26. The muffler 26 thus silences the exhaust gas stepwise, and makes the exhaust gas less liable to rise in temperature as it flows downstream. According to the present embodiment, inasmuch as the downstream oxygen sensor D is disposed closely to the front end of the joint pipe 84 which is most upstream in the muffler 26, the burden on the heater is held to a minimum and the downstream oxygen sensor D is quickly activated.

Figure 26:
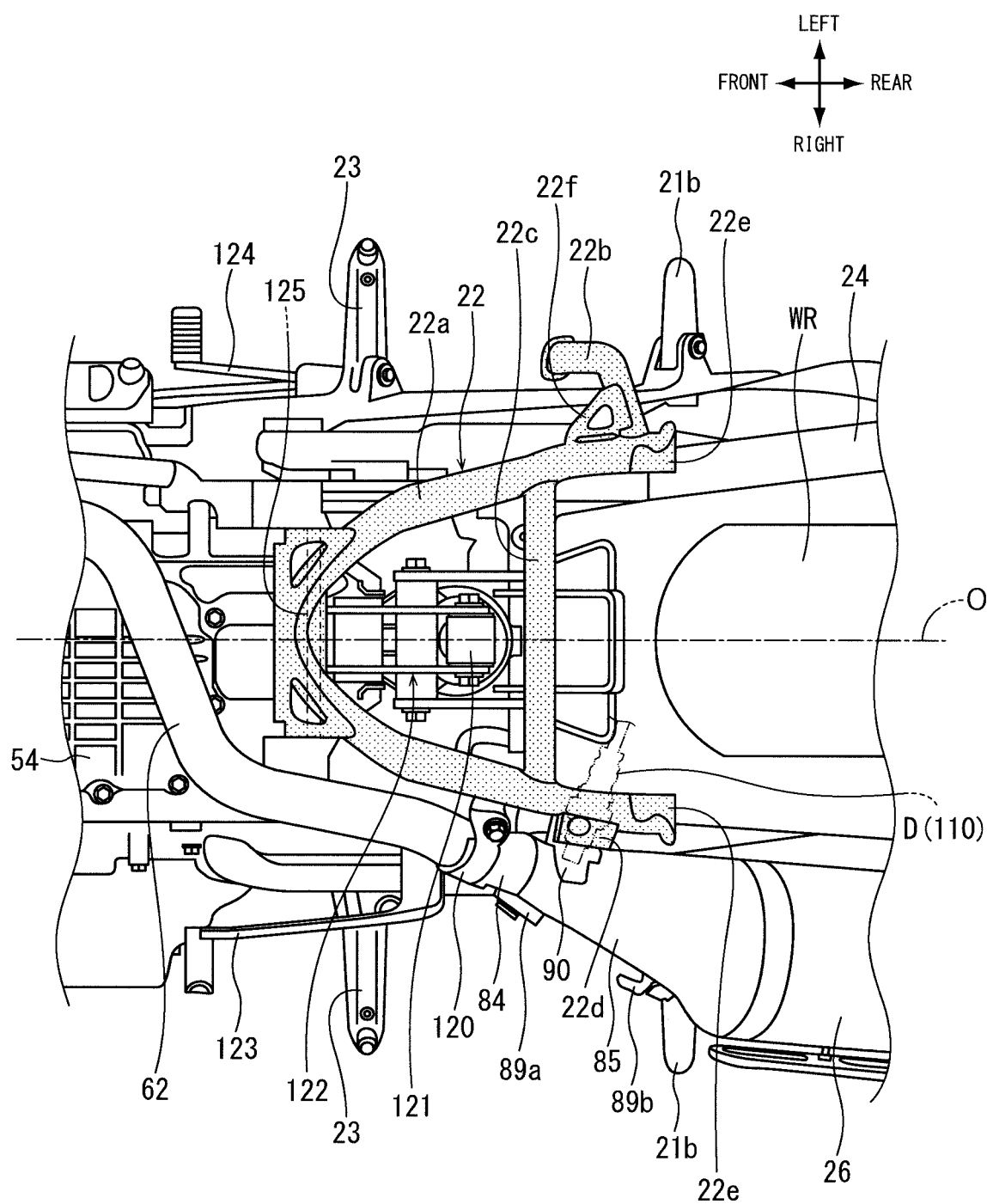
FIG. 26 is a fragmentary enlarged view illustrating a bottom of the motorcycle.
Figure 27:
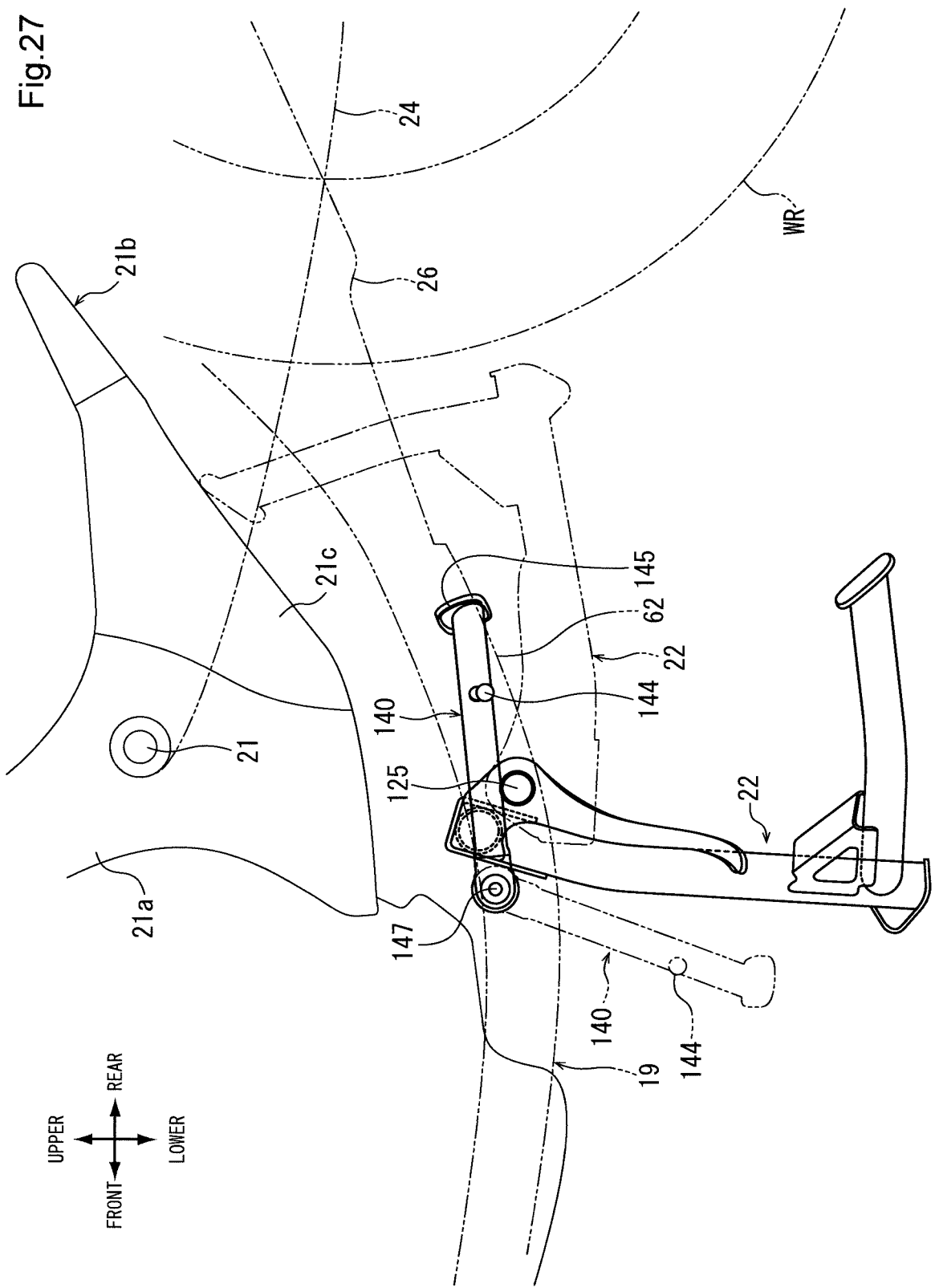
FIG. 27 is a left-hand side elevational view illustrating the positional relationship between a main stand and a side stand, and the muffler.
Figure 28:
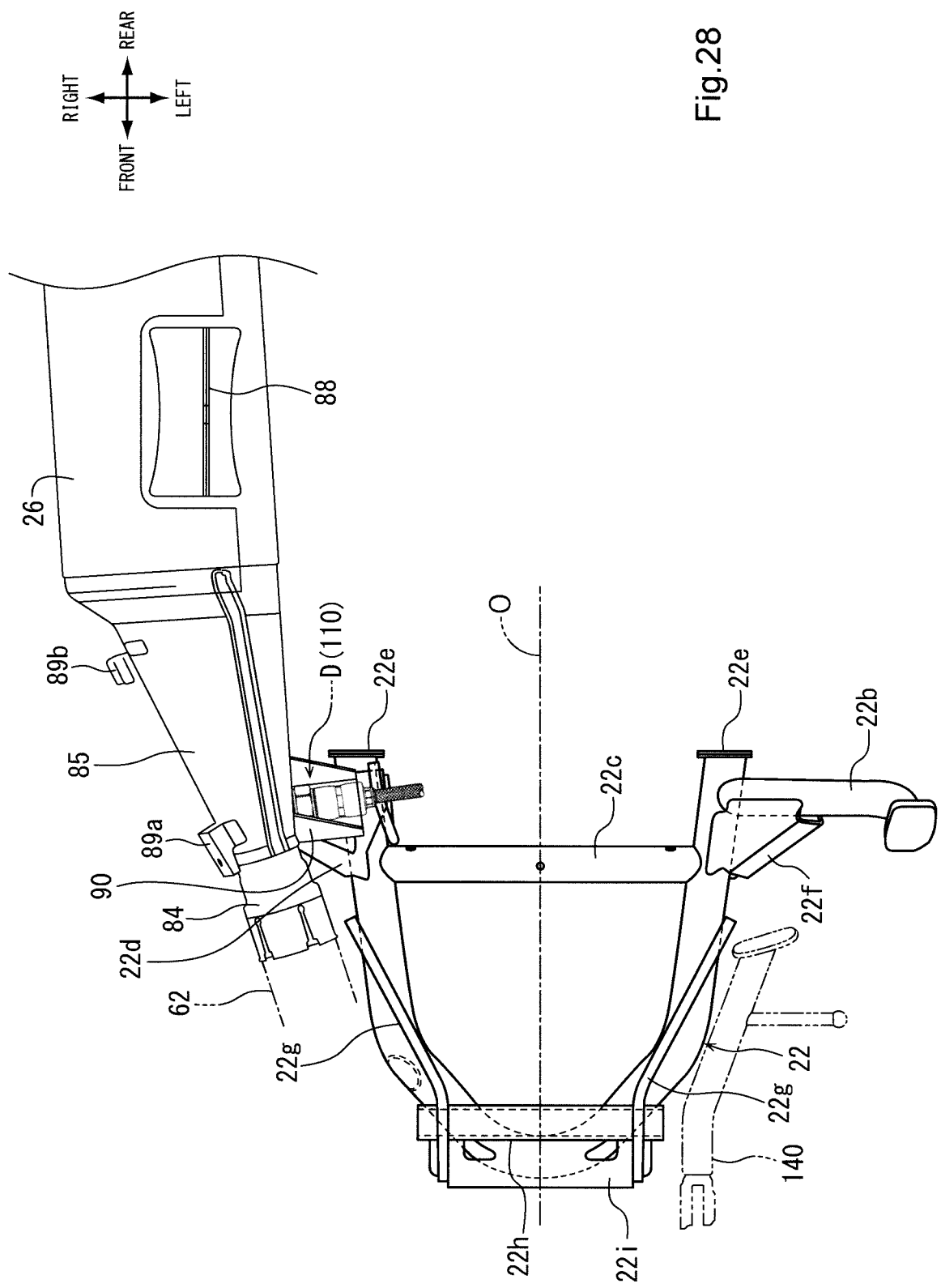
FIG. 28 is a plan view illustrating the positional relationship between the main stand and the side stand, and the muffler.

FIG. 26 is a fragmentary enlarged view illustrating the bottom of the motorcycle 1. FIG. 27 is a left-hand side elevational view illustrating the positional relationship between the main stand 22 and the side stand 140, and the muffler 26, and FIG. 28 is a plan view illustrating the positional relationship between the main stand 22 and the side stand 140, and the muffler 26. According to the present embodiment, the main stand 22 or the side stand 140 makes up a stand device which protects a lower portion or a front and lower portion of the downstream oxygen sensor D.

The intermediate pipe 62 extends from the left side of the vehicle body across the central line O of the vehicle body to the right side of the vehicle body, staying clear of the oil pan 54 of the engine E and the main stand 22, and is connected to the muffler 26. A clamp 120 for preventing an exhaust leakage is wound around the flange 91 that connects the intermediate pipe 62 and the joint pipe 84 to each other. The swing arm 24 is suspended from the vehicle frame 2 by a rear cushion 121 through a link mechanism 122. The main stand 22 has a swing shaft 125 disposed in front of the link mechanism 122. A brake pedal 123 is disposed in front of the right footstep 23, whereas a shift pedal 124 is disposed in front of the left footstep 23.

The main stand 22 is swingably supported on the vehicle frame 2 by the swing shaft 125. The main pipe sections 22a of the main stand 22 are curved into a substantially U shape, and have on their ends grounding soles 22e which touch the ground when the main stand 22 is in use. A gusset 22f which is welded to one of the main pipe sections 22a for increased rigidity is provided on the proximal portion of the foot step 22b that is provided on the left side of the vehicle body in the vehicle widthwise direction.

The mount 22d of the rubber damper 130 is provided in the vicinity of the grounding sole 22e on the right side in the vehicle widthwise direction. The rubber damper 130 is held in abutment against the stand receiver 90 when the main stand 22 is stored. When the main stand 22 is stored, the stand receiver 90 has a lower surface covered with the mount 22d of the rubber damper 130 from below the vehicle body. The side stand 140 is swingably supported on the left side of the vehicle frame 2 in the vehicle widthwise direction by a swing shaft 147 that is positioned forwardly of the swing shaft 125 of the main stand 22.

Figure 29:
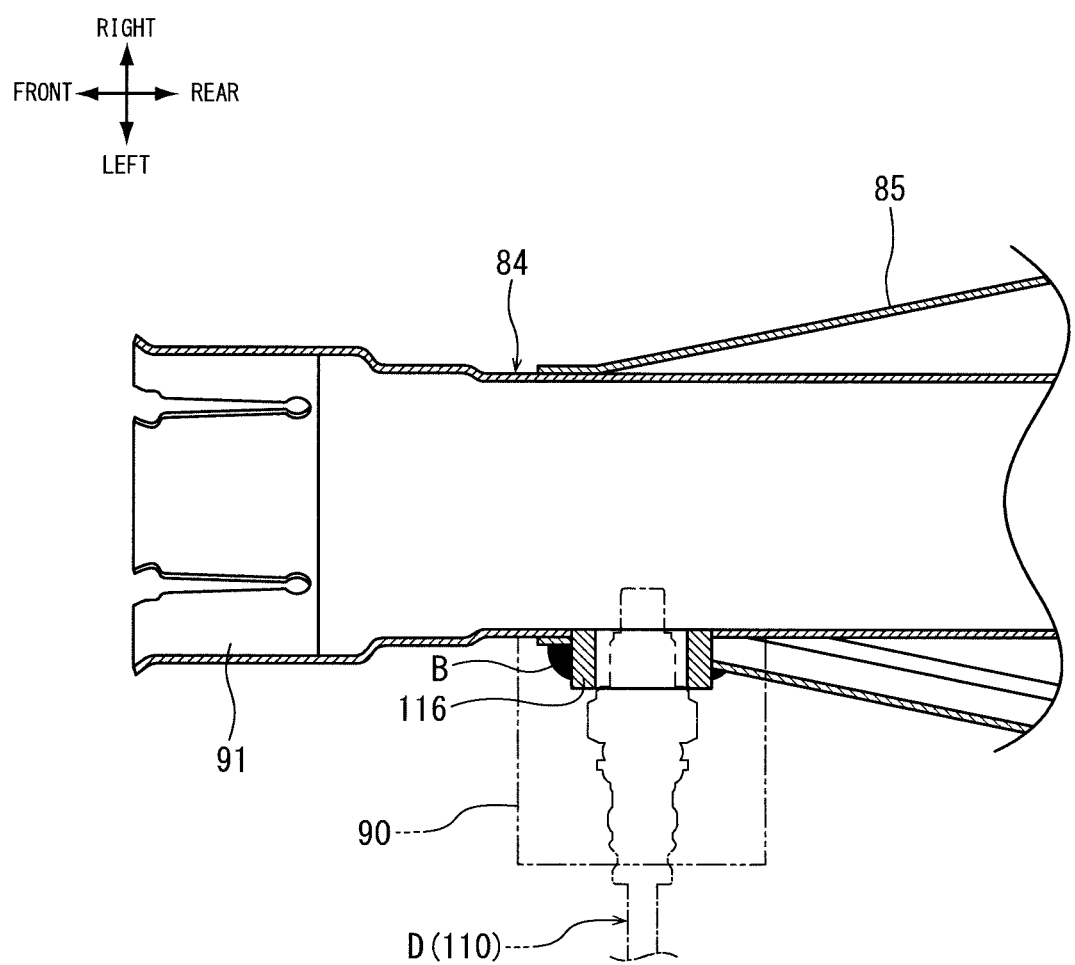
FIG. 29 is an enlarged cross-sectional view of a region where the downstream oxygen sensor is mounted in position.
Figure 30:
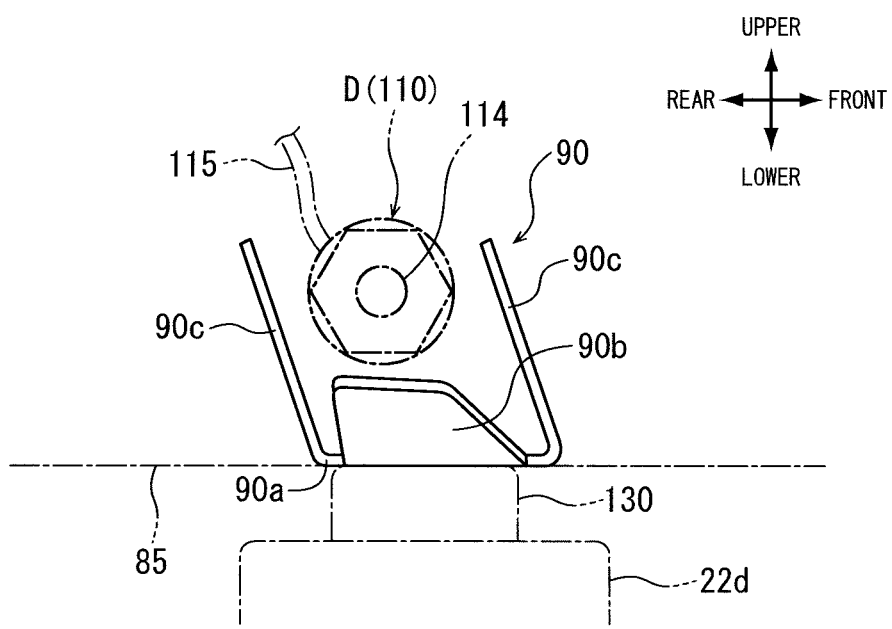
FIG. 30 is a view illustrating the positional relationship between a stand receiver and a rubber damper.

FIG. 29 is an enlarged cross-sectional view of a region where the downstream oxygen sensor D is mounted in position. FIG. 30 is a view illustrating the positional relationship between the stand receiver 90 and the rubber damper 130. The downstream oxygen sensor D is mounted in position by a screw threaded into the mount boss 116 that is fixed in position by extending through the tapered portion 85 and the joint pipe 84. As illustrated in FIG. 30, the stand receiver 90 has wall surfaces 90c on front and rear ends of a bottom surface 90a against which the rubber damper 130 is brought into abutment, and an extension 90b through which the stand receiver 90 is welded to the tapered portion 85. The downstream oxygen sensor D is disposed so as to be housed in the stand receiver 90, making it possible to protect the front, rear, and lower sides of the downstream oxygen sensor D.

Figure 31:
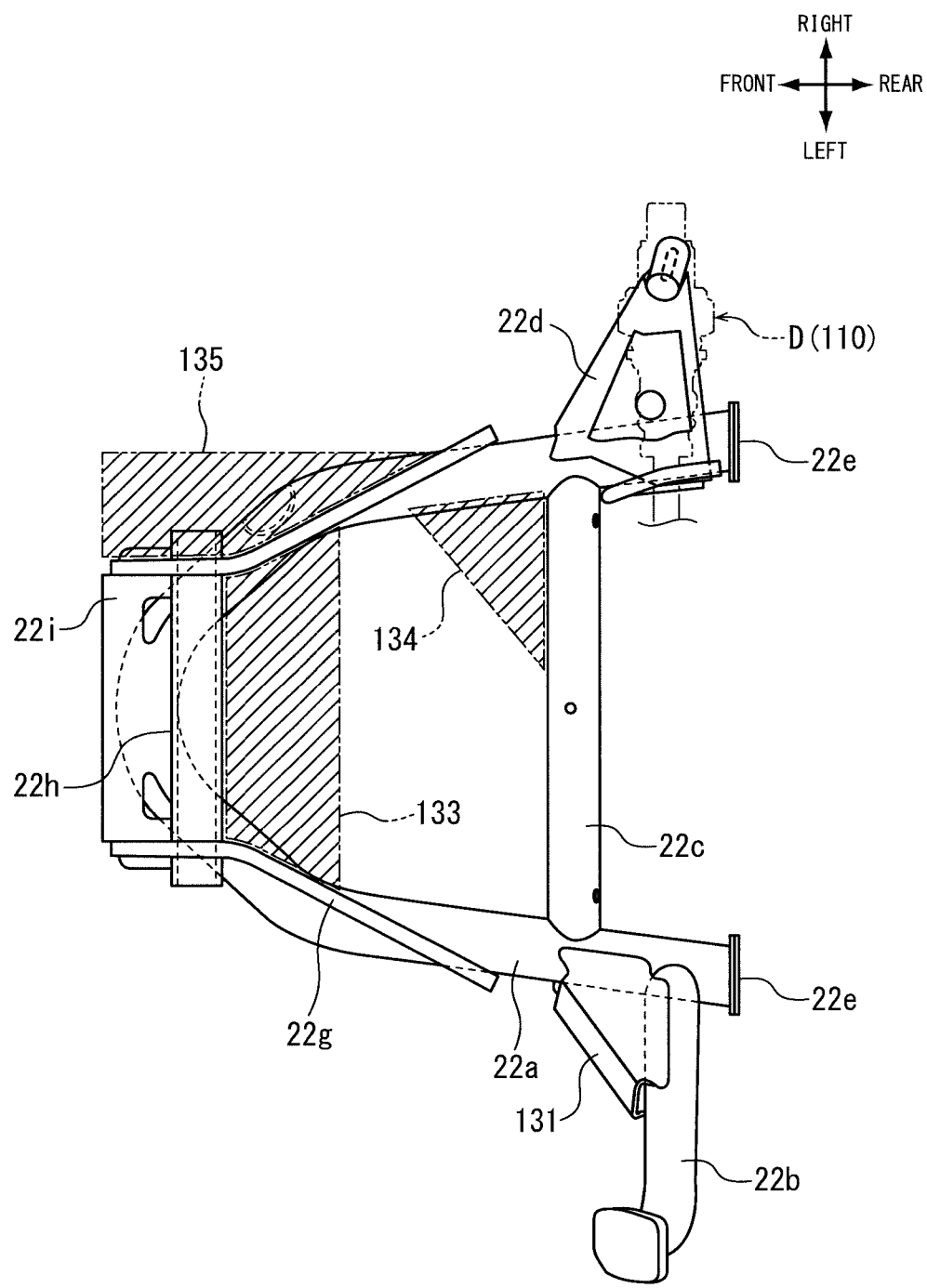
FIG. 31 is a plan view of the main stand.

FIG. 31 is a plan view of the main stand 22. The swing shaft 125 is supported by a swing shaft pipe 22h that is joined to the main pipe sections 22a of the main stand 22 by a front support 22i and a pair of left and right rear supports 22g. The left and right main pipe sections 22a are connected to each other by the reinforcing pipe 22c. As described above, the downstream oxygen sensor D is protected by being mounted in place so as to be surrounded by the stand receiver 90 and by the stand receiver 90 covered with the mount 22d of the rubber damper 130. Furthermore, the downstream oxygen sensor D can be protected securely by adding improvements to the main stand 22.

Specifically, the main stand 22 is provided with gussets 133, 134, and 135 illustrated hatched for receiving jumping pebbles (chipping) or splashing water forwardly of the downstream oxygen sensor D with respect to the vehicle body to prevent them from affecting the downstream oxygen sensor D. The gussets 133, 134, and 135 have a function to not only serve as part of the main stand 22 for protecting the downstream oxygen sensor D, but also increase the rigidity with which the main pipe sections 22a and the rear supports 22g of the main stand 22 are joined to each other and the rigidity with which the main pipe sections 22a and the reinforcing pipe 22c are joined to each other.

Figure 32:
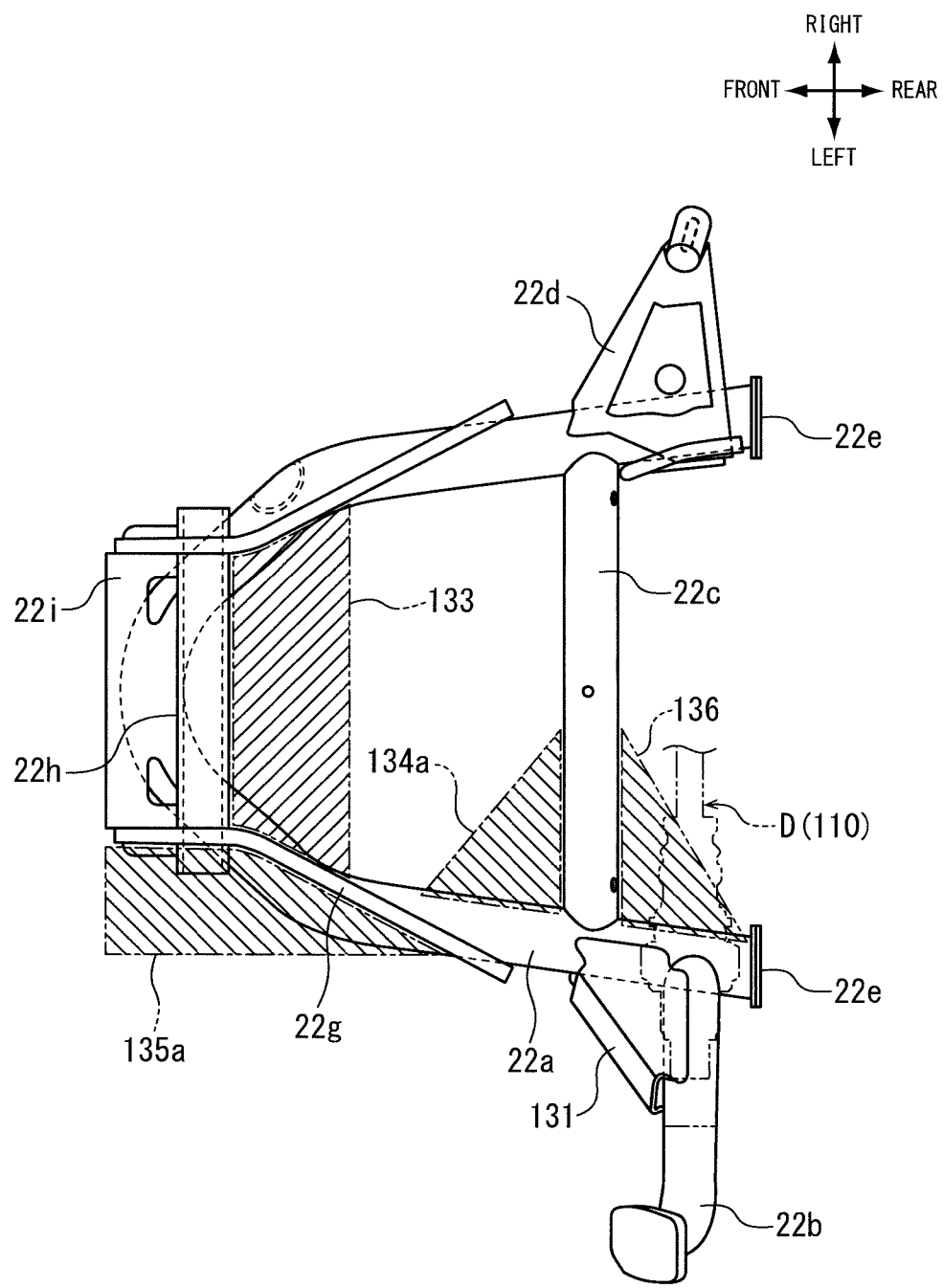
FIG. 32 is a plan view of a main stand according to a modification.

FIG. 32 is a plan view of a main stand 22 according to a modification. If the muffler 26 is disposed on the left side of the vehicle body, not on the right side of the vehicle body, so that the downstream oxygen sensor D mounted on the muffler 26 is also positioned on the left side of the vehicle body, then gussets may be provided on the left side of the vehicle body for protecting the downstream oxygen sensor D. Gussets 134a and 135a are shaped in symmetrical relation to the gussets 134 and 135 illustrated in FIG. 31. According to the present modification, moreover, a triangular gusset 136 is provided between the reinforcing pipe 22c and the grounding sole 22e to cover the underside of the downstream oxygen sensor D. Since the gussets mounted on the main stand 22 are components of the main stand 22 for increasing the rigidity of the respective parts, it is not necessary to provide separate dedicated components for protecting the downstream oxygen sensor D, and hence the production cost is prevented from increasing and the space is effectively utilized.

Figure 33:
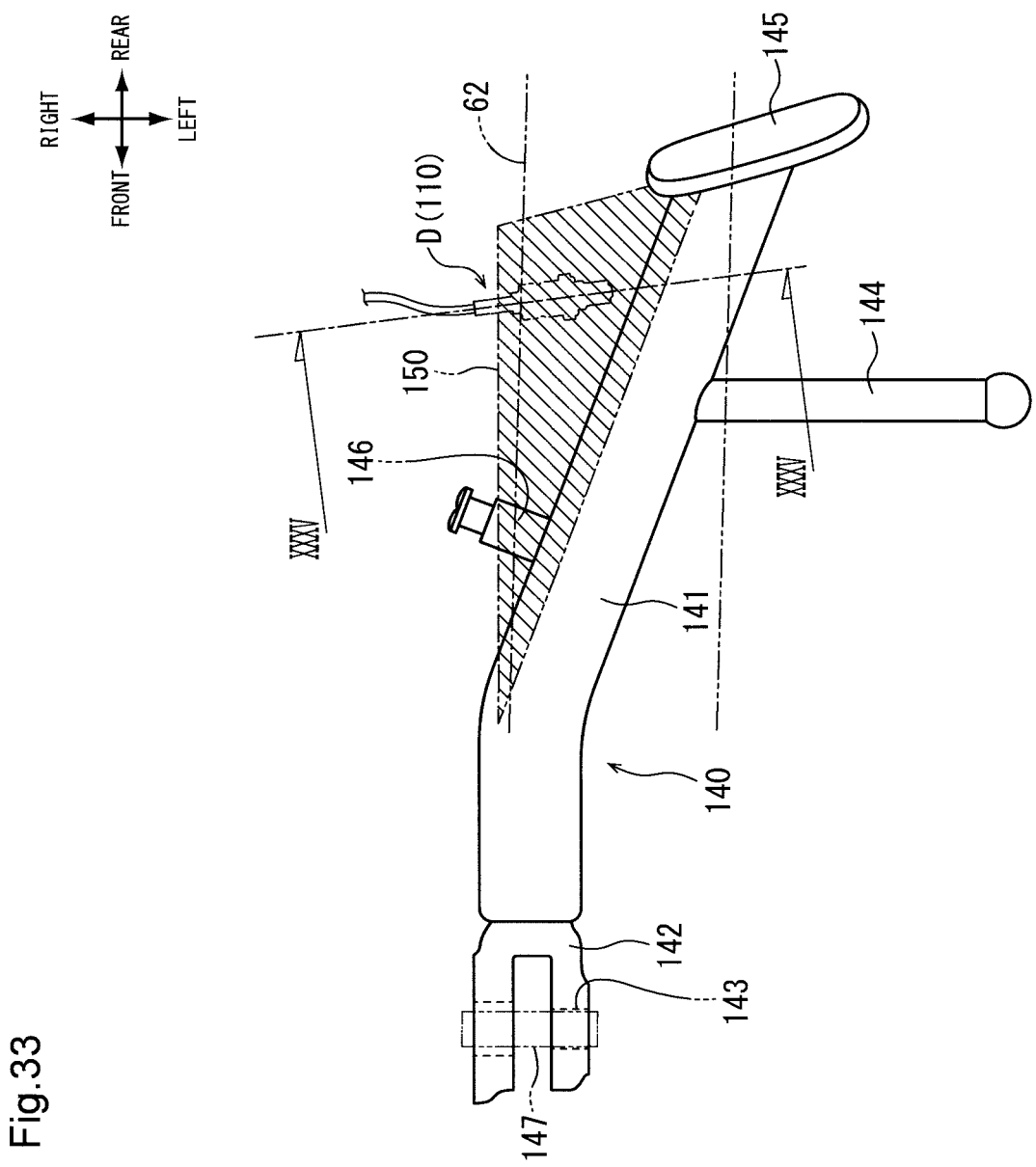
FIG. 33 is a plan view of a side stand according to a modification.
Figure 34:
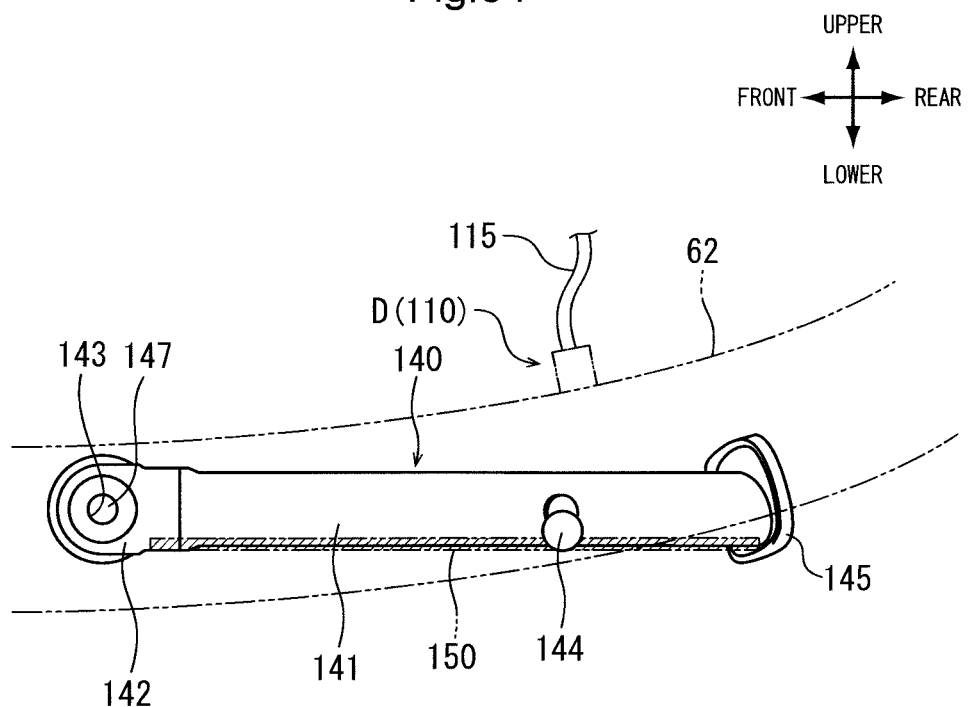
FIG. 34 is a left-hand side elevational view of the side stand.
Figure 35:
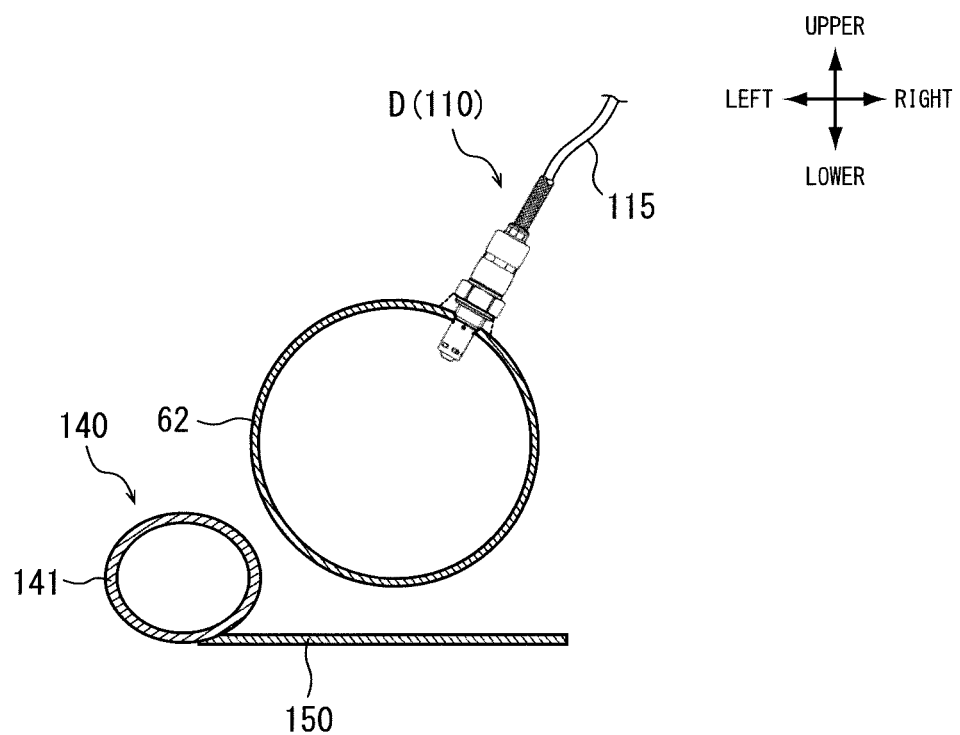
FIG. 35 is a cross-sectional view taken along line XXXV-XXXV of FIG. 33.

FIG. 33 is a plan view of a side stand 140 according to a modification. FIG. 34 is a left-hand side elevational view of the side stand 140, and FIG. 35 is a cross-sectional view taken along line XXXV-XXXV of FIG. 33. The downstream oxygen sensor D may be protected by the side stand 140. If the side stand 140 is provided on the left side of the vehicle body as with the present embodiment, it is suitable for protecting the downstream oxygen sensor D that is disposed close to the left side of the vehicle body, and if the side stand 140 is provided on the right side of the vehicle body, it is suitable for protecting the downstream oxygen sensor D that is disposed close to the right side of the vehicle body. FIGS. 33 through 35 illustrate a structure wherein the intermediate pipe 62 extends on the left side of the vehicle body and the downstream oxygen sensor D mounted on the intermediate pipe 62 is protected by the side stand 140 on the left side of the vehicle body.

The side stand 140 includes a main pipe section 141 connected to the end of a support 142 through which a swing shaft 147 extends, and a grounding sole 145 mounted on the end of the main pipe section 141. A rod-shaped actuator 144 which the rider places its foot on to pull out the side stand 140 is provided on the left side of the main pipe section 141 in the vehicle widthwise direction, and a return spring hook 146 is provided on a side of the main pipe section 141 which is close to the center of the vehicle body. When the side stand 140 is stored, the support 142 is held in abutment against a stopper on the vehicle frame, and hence the stopper serves as a stand receiver. Alternatively, a rubber damper may be mounted on the main pipe section 141 and a stand receiver may be formed on the vehicle body for protecting the downstream oxygen sensor D.

As illustrated in FIG. 27, when stored, the side stand 140 is positioned upwardly of the main stand 22 that is stored as viewed in side elevation of the vehicle body. Therefore, the side stand 140 can possibly protect the downstream oxygen sensor D in a position closer thereto. According to the present embodiment, a substantially triangular gusset 150 is provided on an inner side of the main pipe section 141 in the vehicle widthwise direction for receiving jumping pebbles and splashing water from below the vehicle body.

As illustrated in FIG. 35, the gusset 150 may be mounted on a lower surface of the main pipe section 141 of the side stand 140. In this case, the main pipe section 141 and the intermediate pipe 62 can be disposed more closely to each other than if the gusset 150 is mounted on an upper surface of the main pipe section 141. With this arrangement, even if the downstream oxygen sensor D is not only mounted horizontally on the intermediate pipe 62, but also mounted obliquely thereon at a predetermined angle upwardly from the horizontal direction with respect to the vehicle body, the downstream oxygen sensor D can be protected from splashing water and mud by the gusset 150 that is present in a relatively close position. The shape and installed position of the gusset 150 and the positional relationship between the side stand 140 and the intermediate pipe 62, etc. are not limited to the details and layout described above, but may be modified in various ways. For example, the downstream sensor mounted on the muffler may be protected by the side stand. The downstream oxygen sensor D may be protected not only by the stand device, but by a plate member or the like extending from the step bracket 21c fixed to the vehicle body or the passenger's footstep 21b.

The type of the engine to which the exhaust device is applied, the shape and structure of the exhaust device, the structures of the oxygen sensors, the positions where the oxygen sensors are disposed, and the specific method of detecting deterioration of the catalyst with the two oxygen sensors, etc. are not limited to those illustrated in the above embodiments, but may be modified in various ways. For example, one or both of the oxygen sensors may be an LAF sensor. The exhaust device according to the present invention is applicable to various vehicles including saddle-type three-wheeled or four-wheeled vehicles or the like, not only motorcycles.

REFERENCE SIGNS LIST

1 . . . motorcycle (vehicle),
19 . . . pipe section,
20 . . . exhaust device,
22 . . . main stand,
22a . . . main pipe section,
22d . . . mount,
26 . . . muffler,
43 . . . cylinder block,
52 . . . crankcase,
60 . . . outlet pipe,
61 . . . larger-diameter portion,
62 . . . intermediate pipe,
65 . . . mating region,
66 . . . smaller-diameter portion,
67 . . . bent portion,
68 . . . recessed portion (recessed-projected portion),
76 . . . outer shell,
80 . . . dispersion plate (dispersing means),
83 . . . rear portion,
85 . . . tapered portion,
90 . . . stand receiver,
90a . . . bottom surface,
90c . . . wall surface,
100 . . . heaterless oxygen sensor,
110 . . . heater-mounted oxygen sensor,
130 . . . rubber damper,
133, 134, 135, 136, 150 . . . gusset,
140 . . . side stand,
C catalyzer,
U . . . upstream oxygen sensor,
D . . . downstream oxygen sensor

The invention claimed is:

1. An exhaust device for a motorcycle having a pipe section extending below an engine for guiding an exhaust gas therefrom rearwardly with respect to a vehicle body and housing a catalyzer therein, and a muffler connected to a rear end of said pipe section, comprising:

an upstream oxygen sensor disposed on said pipe section and positioned upstream of said catalyzer and a downstream oxygen sensor disposed on said pipe section and positioned downstream of said catalyzer, wherein:

said pipe section includes a larger-diameter portion having an increased diameter, compared with a rest of the pipe section, for housing said catalyzer therein, said downstream oxygen sensor is disposed in said larger-diameter portion, said upstream oxygen sensor and said downstream oxygen sensor are positioned upwardly of a central line of said larger-diameter portion with respect to the vehicle body as viewed in side elevation of the vehicle body, said engine has a cylinder whose cylinder axis is inclined forwardly of the vehicle body with respect to a vertical direction, said larger-diameter portion is disposed such that said larger-diameter portion has a central axis substantially parallel to said cylinder axis, said upstream oxygen sensor is mounted outwardly from the inside of said pipe section in the vehicle widthwise direction, and said larger-diameter portion is positioned outside of an oil filter which is projected into a front surface of a crankcase, and an intermediate pipe coupled to the rear end of the larger-diameter portion passes through side portions of an oil pan below said crankcase, the pipe section is bent between the larger-diameter portion and the intermediate pipe to form a bent part, and the downstream oxygen sensor is arranged inside the bent part, and wherein a longitudinal central axis of the larger-diameter portion and a longitudinal central axis of the intermediate pipe form an angle less than 180°, and the downstream oxygen sensor is mounted on an inclined portion which is inclined with respect to a longitudinal central axis of the larger-diameter portion, and is positioned within said angle between the larger-diameter portion and the intermediate pipe.

2. The exhaust device for a motorcycle according to claim 1, wherein said larger-diameter portion is positioned below a cylinder block of said engine and in front of a crankcase of said engine, and both said upstream oxygen sensor and said downstream oxygen sensor include a heaterless oxygen sensor free of a heater function.

3. The exhaust device for a motorcycle according to claim 2, wherein dispersing means for dispersing the exhaust gas which has passed through said catalyzer is provided between said catalyzer and said downstream oxygen sensor within said larger-diameter portion.

4. The exhaust device for a motorcycle a according to claim 2, wherein said upstream oxygen sensor is mounted on an outlet pipe positioned upstream of said larger-diameter portion.

5. The exhaust device for a motorcycle according to claim 4, wherein said outlet pipe includes a smaller-diameter portion connected to an exhaust port of said engine, said upstream oxygen sensor being mounted on said smaller-diameter portion, and a bent portion connected to said smaller-diameter portion for bending a direction in which the exhaust gas is discharged rearwardly with respect to the vehicle body and connected to said larger-diameter portion, and said bent portion has a recessed-projected portion configured to disperse the exhaust gas.

6. The exhaust device for a motorcycle according to claim 2, wherein said larger-diameter portion is of an assembled hollow structure having a mating region of two separate members of an outer shell which are joined to each other, and a mount boss for mounting said downstream oxygen sensor thereon is provided in a position on said mating region, thereby closing a clearance on a reverse side of said mating region with said mount boss.

7. The exhaust device for a motorcycle according to claim 6, wherein said larger-diameter portion includes a front portion as said outer shell which is of said assembled hollow structure, and a rear portion as an integral component, said catalyzer is disposed in said front portion, and said dispersing means and said downstream oxygen sensor are disposed on said rear portion.

8. The exhaust device for a motorcycle according to claim 2, further comprising:

a catalyst diagnosing unit configured to diagnose and detect a deteriorated state of said catalyzer on the basis of sensor outputs from said upstream oxygen sensor and said downstream oxygen sensor, wherein when said catalyst diagnosing unit diagnoses said catalyzer as being deteriorated, an indicator is activated to indicate the deteriorated state to an occupant of the motorcycle.

9. The exhaust device for a motorcycle according to claim 1, wherein dispersing means for dispersing the exhaust gas which has passed through said catalyzer is provided between said catalyzer and said downstream oxygen sensor within said larger-diameter portion.

10. The exhaust device for a motorcycle according to claim 1, wherein said upstream oxygen sensor is mounted on an outlet pipe positioned upstream of said larger-diameter portion.

11. The exhaust device for a motorcycle according to claim 10, wherein said outlet pipe includes a smaller-diameter portion connected to an exhaust port of said engine, said upstream oxygen sensor being mounted on said smaller-diameter portion, and a bent portion connected to said smaller-diameter portion for bending a direction in which the exhaust gas is discharged rearwardly with respect to the vehicle body and connected to said larger-diameter portion, and said bent portion has a recessed-projected portion configured to disperse the exhaust gas.

12. The exhaust device for a motorcycle according to claim 1, wherein said larger-diameter portion is of an assembled hollow structure having a mating region of two separate members of an outer shell which are joined to each other, and a mount boss for mounting said downstream oxygen sensor thereon is provided in a position on said mating region, thereby closing a clearance on a reverse side of said mating region with said mount boss.

13. The exhaust device for a motorcycle according to claim 12, wherein said larger-diameter portion includes a front portion as said outer shell which is of said assembled hollow structure, and a rear portion as an integral component, said catalyzer is disposed in said front portion, and said dispersing means and said downstream oxygen sensor are disposed on said rear portion.

14. The exhaust device for a motorcycle according to claim 1, further comprising:

a catalyst diagnosing unit configured to diagnose and detect a deteriorated state of said catalyzer on the basis of sensor outputs from said upstream oxygen sensor and said downstream oxygen sensor, wherein when said catalyst diagnosing unit diagnoses said catalyzer as being deteriorated, an indicator is activated to indicate the deteriorated state to an occupant of the motorcycle.

\* \* \* \* \*